(12) United States Patent
Guilford et al.

(10) Patent No.: US 11,516,013 B2
(45) Date of Patent: Nov. 29, 2022

(54) ACCELERATOR FOR ENCRYPTING OR DECRYPTING CONFIDENTIAL DATA WITH ADDITIONAL AUTHENTICATION DATA

(71) Applicant: Intel Corporation, Santa Clara, CA (US)

(72) Inventors: James Guilford, Northborough, MA (US); Vinodh Gopal, Westborough, MA (US); Kirk Yap, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 258 days.

(21) Appl. No.: 16/022,619

(22) Filed: Jun. 28, 2018

(65) Prior Publication Data
US 2020/0007329 A1 Jan. 2, 2020

(51) Int. Cl.
*H04L 29/06* (2006.01)
*H04L 9/32* (2006.01)
*H04L 9/06* (2006.01)

(52) U.S. Cl.
CPC .............. *H04L 9/32* (2013.01); *H04L 9/0643* (2013.01)

(58) Field of Classification Search
CPC ................................ H04L 9/32; H04L 9/0643
USPC ......................................................... 713/193
See application file for complete search history.

(56) References Cited

U.S. PATENT DOCUMENTS

| | | | |
|---|---|---|---|
| 9,087,187 B1 * | 7/2015 | Doane ..................... H04L 9/321 |
| 9,774,578 B1 * | 9/2017 | Ateniese ............... H04L 9/0894 |
| 9,832,022 B1 * | 11/2017 | Pedersen ................ H04L 9/3247 |
| 10,237,066 B1 * | 3/2019 | Langhammer ........ H04L 9/0637 |
| 2002/0032551 A1 * | 3/2002 | Zakiya ................. G06F 16/9014 703/2 |
| 2009/0019551 A1 * | 1/2009 | Haga ....................... G06F 21/57 726/27 |
| 2011/0107112 A1 * | 5/2011 | Resch .................. G06F 11/1004 713/193 |
| 2016/0226660 A1 * | 8/2016 | Takatsu ................. H04L 9/3239 |
| 2016/0365978 A1 * | 12/2016 | Ganesan ............... H04L 9/3239 |
| 2016/0378687 A1 * | 12/2016 | Durham ................ H04L 9/3242 713/193 |
| 2019/0245688 A1 * | 8/2019 | Patin ..................... H04L 9/0869 |

OTHER PUBLICATIONS

Gharaibeh, "A GPU accelerated storage system", 2010, Proceeding of the 19th ACM, pp. 1-12 (Year: 2010).*

(Continued)

*Primary Examiner* — Taghi T Arani
*Assistant Examiner* — Gregory A Lane
(74) *Attorney, Agent, or Firm* — Nicholson De Vos Webster & Elliott LLP

(57) ABSTRACT

Disclosed embodiments relate to encrypting or decrypting confidential data with additional authentication data by an accelerator and a processor. In one example, a processor includes processor circuitry to compute a first hash of a first block of data stored in a memory, store the first hash in the memory, and generate an authentication tag based in part on a second hash. The processor further includes accelerator circuitry to obtain the first hash from the memory, decrypt a second block of data using the first hash, and compute the second hash based in part on the first hash and the second block of data.

20 Claims, 19 Drawing Sheets

(56) References Cited

OTHER PUBLICATIONS

Galois/Counter Mode; retrieved from https://en.wikipedia.org/wiki/Galois/Counter_Mode, Jun. 22, 2018, 6 pages.
Morris Dworkin, National Institute of Standards and Technology Special Publication 800-38D, "Recommendation for Block Cipher Modes of Operation: Galois/Counter Mode(GCM) and GMAC", Nov. 2007, 39 pages.
Federal Information Processing Standard Publication 197, "Advanced Encryption Standard (AES)", Nov. 26, 2001, 51 pages.

* cited by examiner

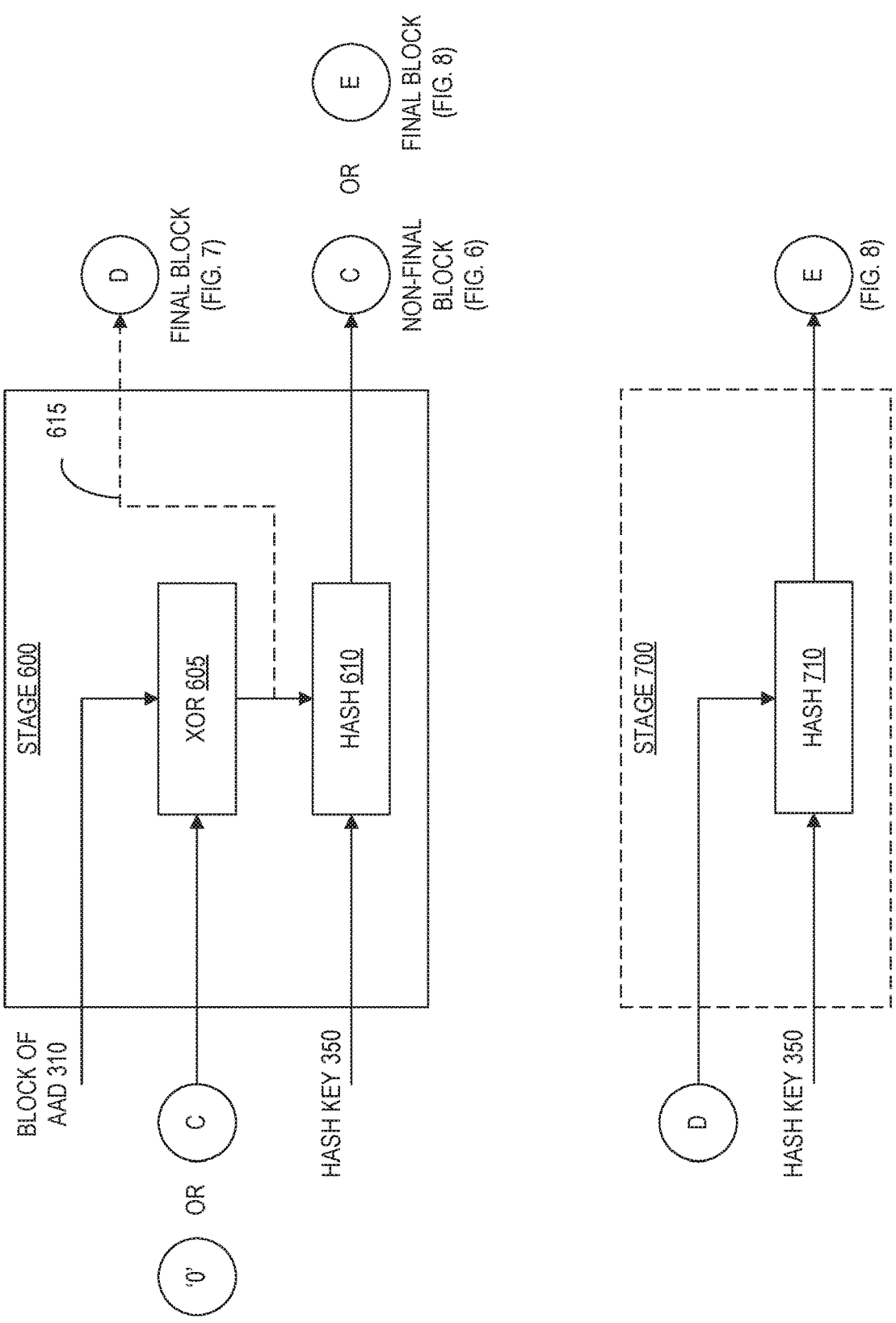

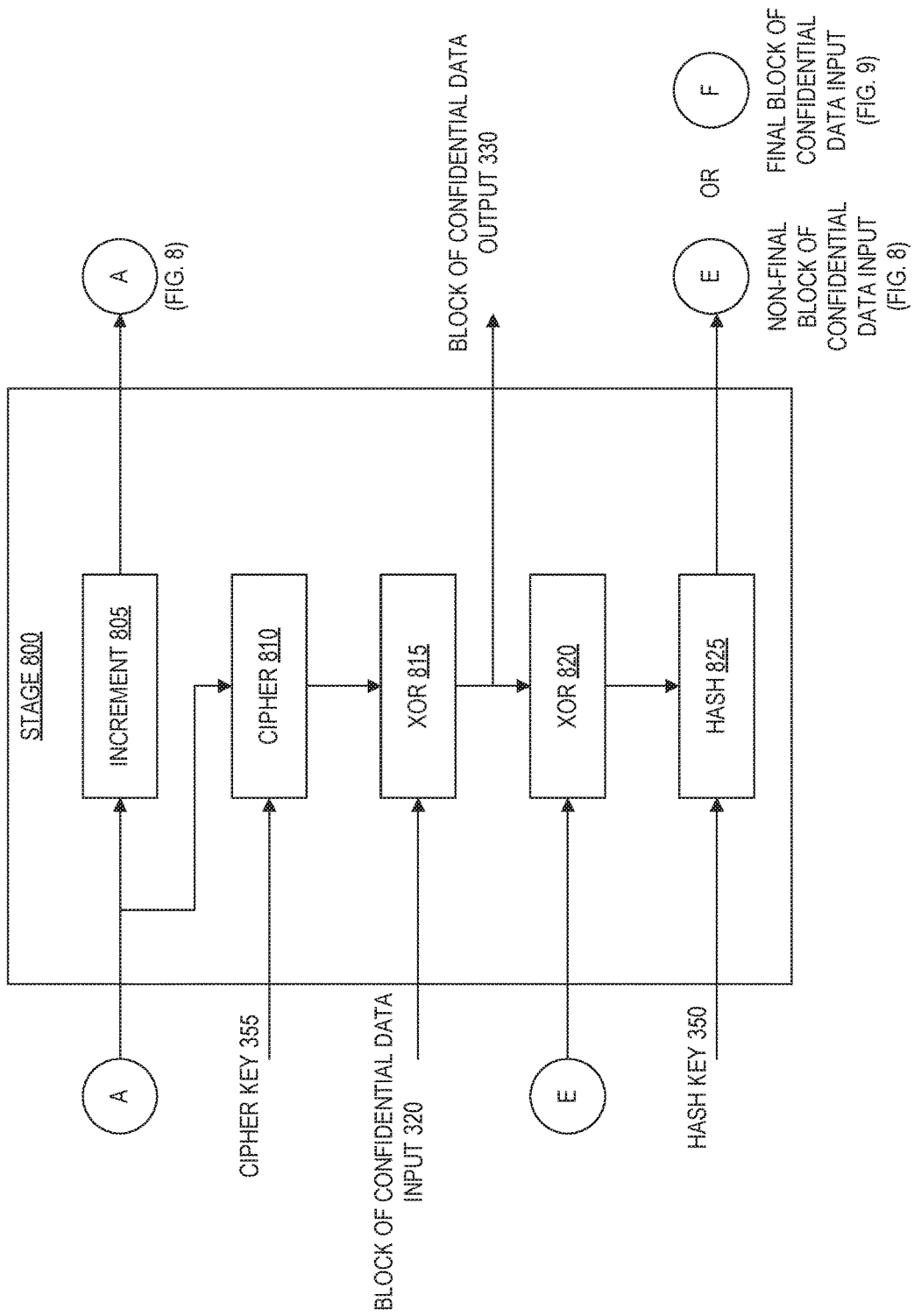

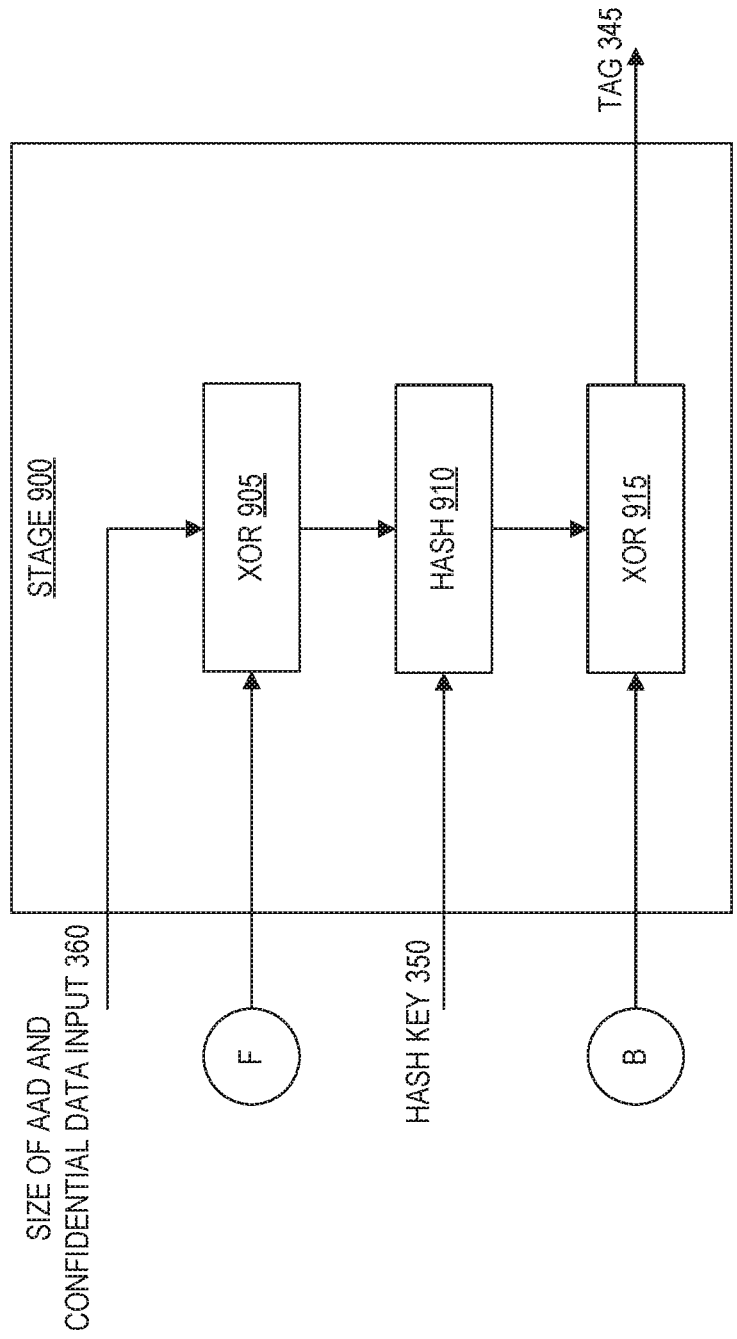

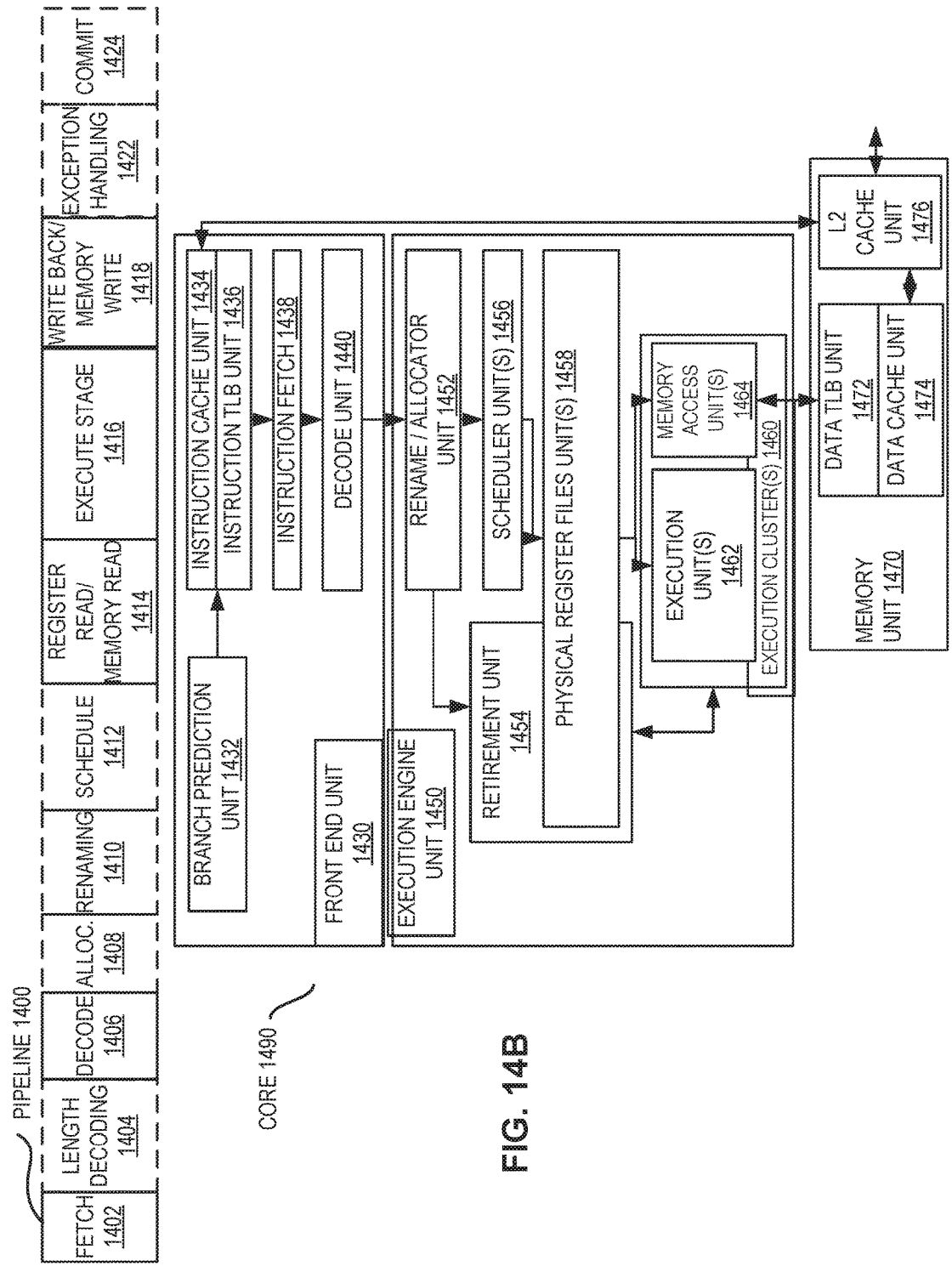

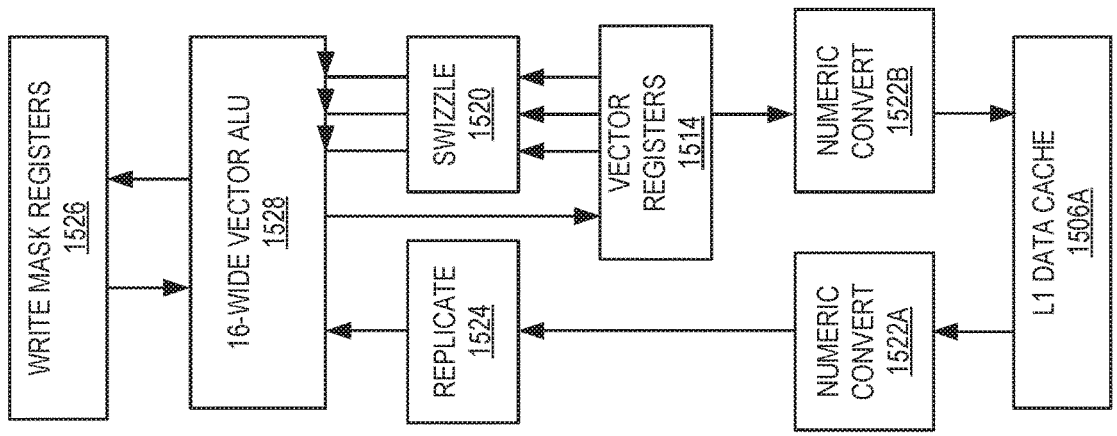
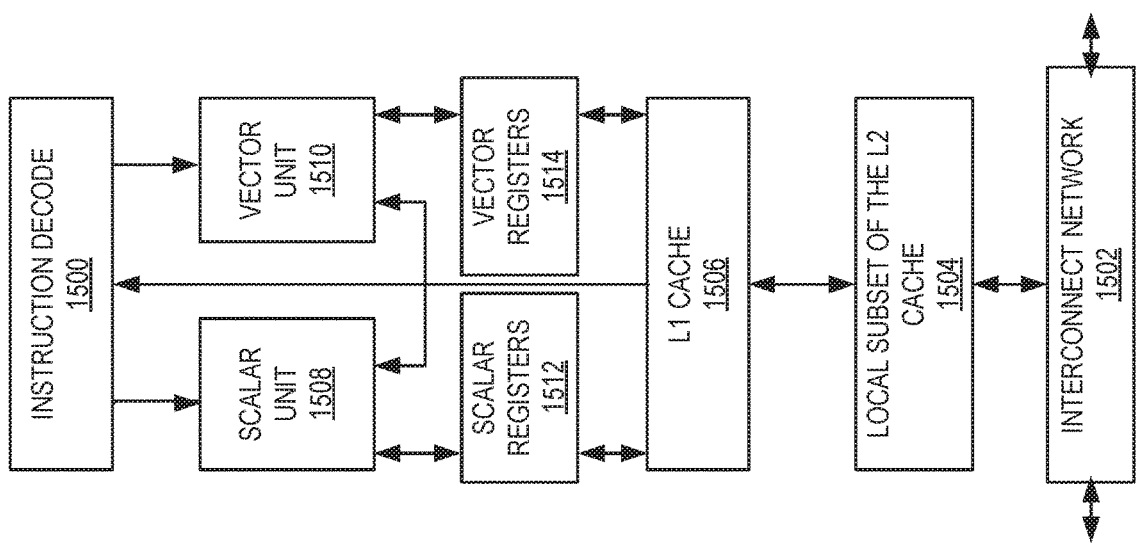

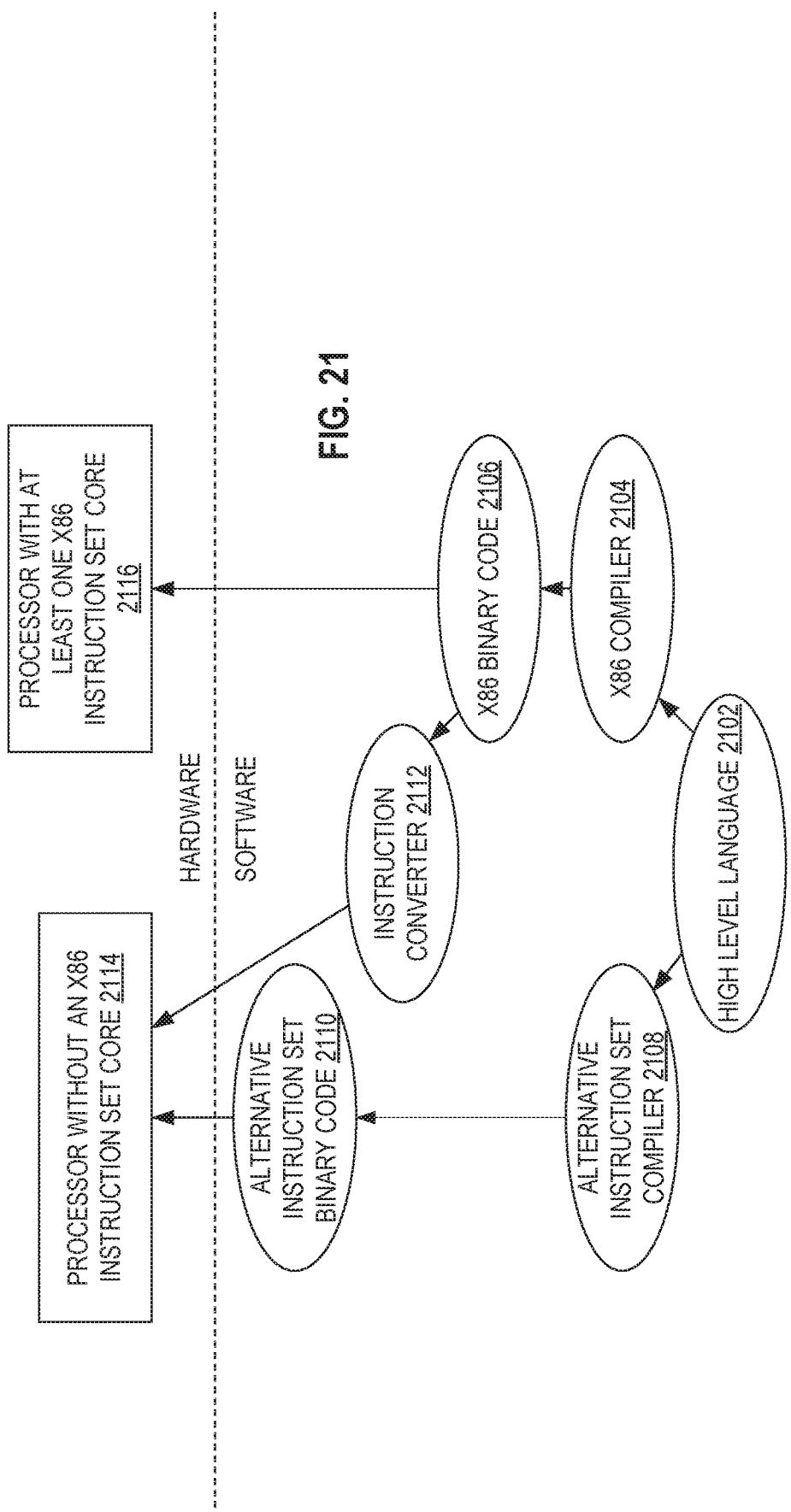

ACCELERATOR FOR ENCRYPTING OR DECRYPTING CONFIDENTIAL DATA WITH ADDITIONAL AUTHENTICATION DATA

BACKGROUND

Field of the Invention

This invention relates generally to the field of computer processors. More particularly, the invention relates to a method and apparatus for high performance encryption, decryption, and authentication of data.

Description of the Related Art

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

BRIEF DESCRIPTION OF THE DRAWINGS

A better understanding of the present invention can be obtained from the following detailed description in conjunction with the following drawings, in which:

FIGS. 6 and 7 are block diagrams of an additional authentication data hashing stage of an approach for encrypting/decrypting and authenticating confidential data and authenticating additional data;

FIG. 8 is a block diagram of a confidential data encryption or decryption and hashing stage of an approach for encrypting/decrypting and authenticating confidential data and authenticating additional data;

FIG. 9 is a block diagram of a final stage of an approach for encrypting/decrypting and authenticating confidential data and authenticating additional data;

FIG. 14A is a block diagram illustrating both an exemplary in-order pipeline and an exemplary register renaming, out-of-order issue/execution pipeline according to embodiments of the invention;

FIG. 14B is a block diagram illustrating both an exemplary embodiment of an in-order architecture core and an exemplary register renaming, out-of-order issue/execution architecture core to be included in a processor according to embodiments of the invention;

FIGS. 15A-B illustrate a block diagram of a more specific exemplary in-order core architecture, which core would be one of several logic blocks (including other cores of the same type and/or different types) in a chip;

FIG. 15A is a block diagram of a single processor core, along with its connection to the on-die interconnect network 1502 and with its local subset of the Level 2 (L2) cache 1504, according to embodiments of the invention;

FIG. 15B is an expanded view of part of the processor core in FIG. 15A according to embodiments of the invention;

FIG. 17 shown a block diagram of a system in accordance with one embodiment of the present invention;

FIG. 18 is a block diagram of a first more specific exemplary system in accordance with an embodiment of the present invention;

FIG. 19 is a block diagram of a second more specific exemplary system in accordance with an embodiment of the present invention;

FIG. 20 is a block diagram of a SoC in accordance with an embodiment of the present invention; and FIG. 21 is a block diagram contrasting the use of a software instruction converter to convert binary instructions in a source instruction set to binary instructions in a target instruction set according to embodiments of the invention.

DETAILED DESCRIPTION

In the following description, for the purposes of explanation, numerous specific details are set forth in order to provide a thorough understanding of the embodiments of the invention described herein. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Accelerator for Encrypting or Decrypting Confidential Data with Additional Authentication Data Processing cipher operations often involves performing large numbers of specialized operations, which can bottleneck a system when performed using a core of a Central Processing Unit (CPU) by consuming valuable compute cycles. To avoid such bottlenecks, some systems include an accelerator to perform the specialized operations to reduce the workload of the processor and increase the speed at which the cipher operations are performed. Such an arrangement may be particularly useful for performing data operations on a high-bandwidth encrypted medium, such as an in-memory database (IMDB) system.

Figure 1:
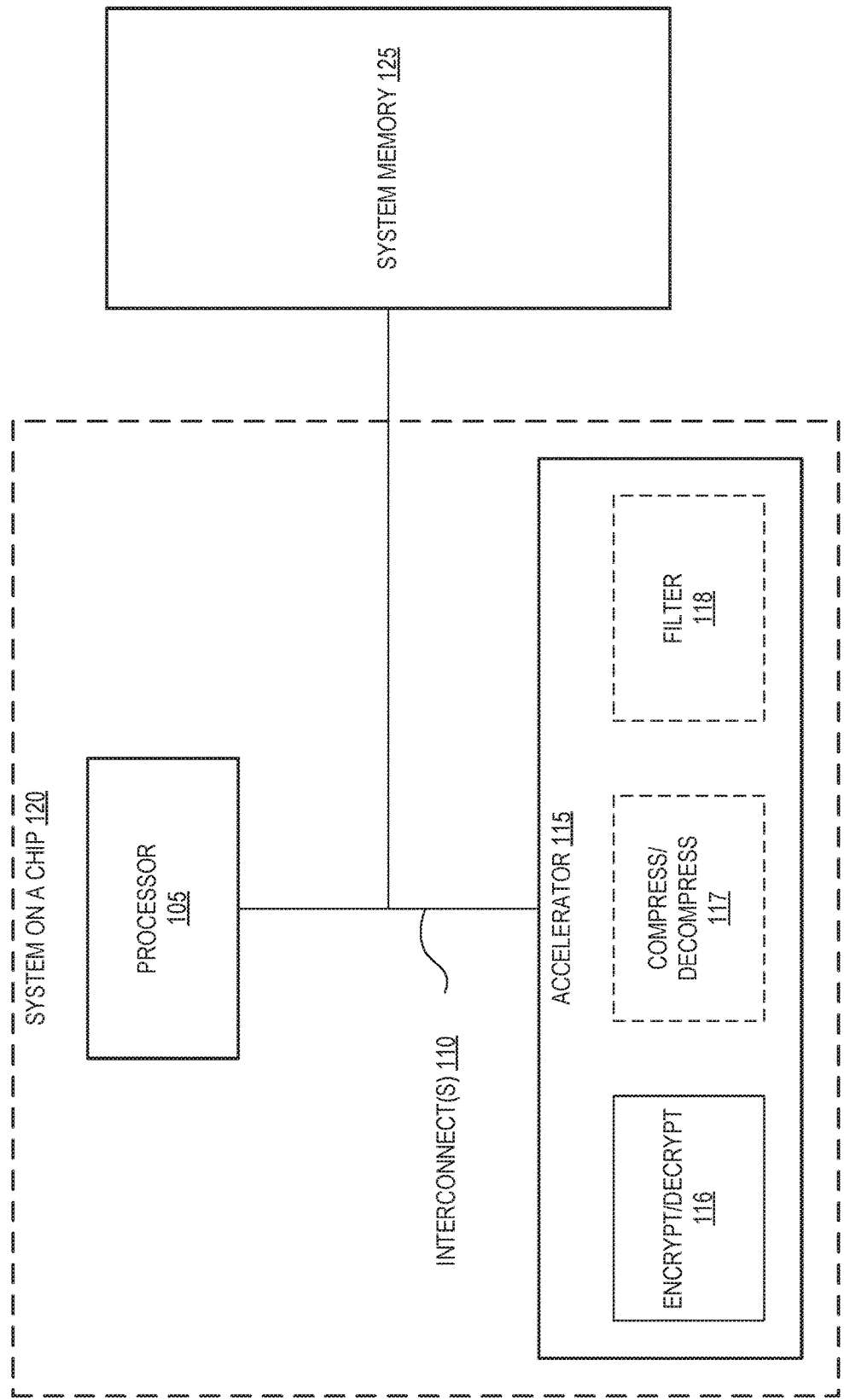
FIG. 1 is a block diagram illustrating an exemplary embodiment of a system including a processor and an accelerator.

FIG. 1 is a block diagram illustrating an exemplary embodiment of a system including a processor and an accelerator. System includes a processor 105, an accelerator 115, and a system memory 125, coupled by one or more interconnects 110. Processor 105 may any type of processor that can perform the functions of processor 105 described herein, such as a microcontroller, digital signal processor (DSP), or a CPU that includes one or more processor cores like those described with reference to FIGS. 14-15.

System memory 125 may be a volatile, non-volatile memory, or a combination of the two. Examples of volatile memory include dynamic random access memory (DRAM) and static random access memory (SRAM). Examples of non-volatile memory include phase-change memory (PCM) (e.g., Intel 3D XPoint™ memory), flash-based memory (e.g., NAND or NOR based flash), magnetic-based memory, or the like. Processor 105 and accelerator 115 can access system memory 125. In some embodiments, one or more memory controllers (not shown) reside between interconnect 110 and system memory 125 to provide processor 105 and accelerator 115 with access to system memory 125.

Accelerator 115 includes an encryption/decryption unit 116 and, in some embodiments, further includes a compress/decompress unit 117 and/or filter unit 118. Compress/decompress unit 117 and/or filter unit 118 is particularly suited for operations on databases, such as an IMDB, that include large amounts of compressed data that can be filtered based on a query. Accelerator 115 may be any type of device that can perform the functions of accelerator 115 described herein, such as a field-programmable gate array (FPGA), an application specific integrated circuit (ASIC), a coprocessor, SoC block, IP core, or other hardware.

Interconnect(s) 110 may comprise one or more or combinations of switching fabrics, busses, crossbars, networks, or the like, to communicatively couple processor 105, accelerator 115, and system memory 125. Exemplary interconnects include Peripheral Component Interconnect Express (PCIe), Advanced Microcontroller Bus Architecture (AMBA), QuickPath Interconnect (QPI), and the like.

In some embodiments, a system-on-a-chip (SoC) 120 includes both processor 105 and accelerator 115. In some embodiments, SoC further includes system memory 125. Additional exemplary systems are described with reference to FIGS. 16-20.

Figure 2:
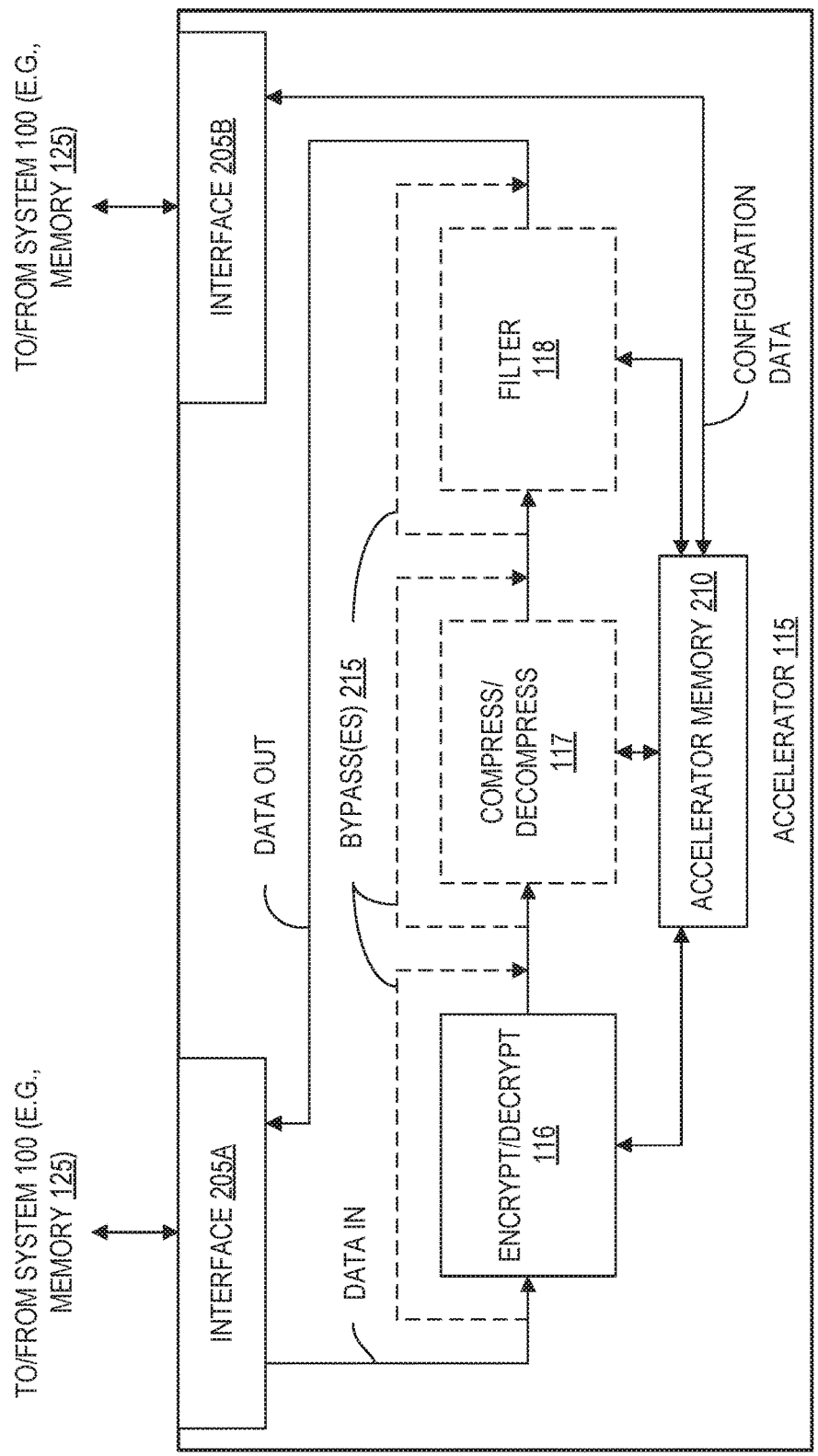
FIG. 2 is a block diagram illustrating an exemplary embodiment of an accelerator.

FIG. 2 is a block diagram illustrating an exemplary embodiment of an accelerator 115. As mentioned, accelerator 115 includes encryption/decryption unit 116 and, in some embodiments, further includes a compress/decompress unit 117 and/or filter unit 118. Accelerator 115 includes one or more bypasses 215 to bypass units 116, 117, and/or 118, enabling the accelerator to perform various combinations of operations on data (e.g., decrypt and decompress, compress and filter, filter only, etc.).

In this embodiment, accelerator 115 includes a first interface 205A and a second interface 205B that facilitate communications to/from other system resources (e.g., processor 105, system memory 125). In some embodiments, interfaces 205A, 205B are interconnect interfaces (e.g., PCIe endpoints) that can access system resources via interconnect 110. In some embodiments, accelerator 115 includes more or fewer than two interfaces 205A and 205B. In other embodiments, accelerator 115 only includes two interfaces 205A and 205B. Interface 205A handles input/output (I/O) operations of data processed by one or more of encryption/ decryption unit 116, compress/decompress unit 117, and filter unit 118. For example, the input data may be a stream of data referred to as a plaintext (e.g., unencrypted data) or a ciphertext (e.g., encrypted data) that the encrypt/decrypt unit 116 respectively encrypts into a ciphertext or decrypts into a plaintext for output.

Interface 205B handles I/O operations of configuration data used to configure how one or more of encryption/ decryption unit 116, compress/decompress unit 117, and filter unit 118 processes data. Configuration data is stored in an accelerator memory 210. Accelerator memory may be a volatile memory or a non-volatile memory. While accelerator memory 210 is illustrated separately from units 116, 117, and 118, in some embodiments, the storage functionality of accelerator memory 210 is distributed amongst units 116, 117, and/or 118.

In some embodiments, accelerator 115 may include one or more data buffers (not shown) to buffer data that it reads from or writes to system memory 125 (e.g., via interfaces 205A, 205B).

Figure 3:
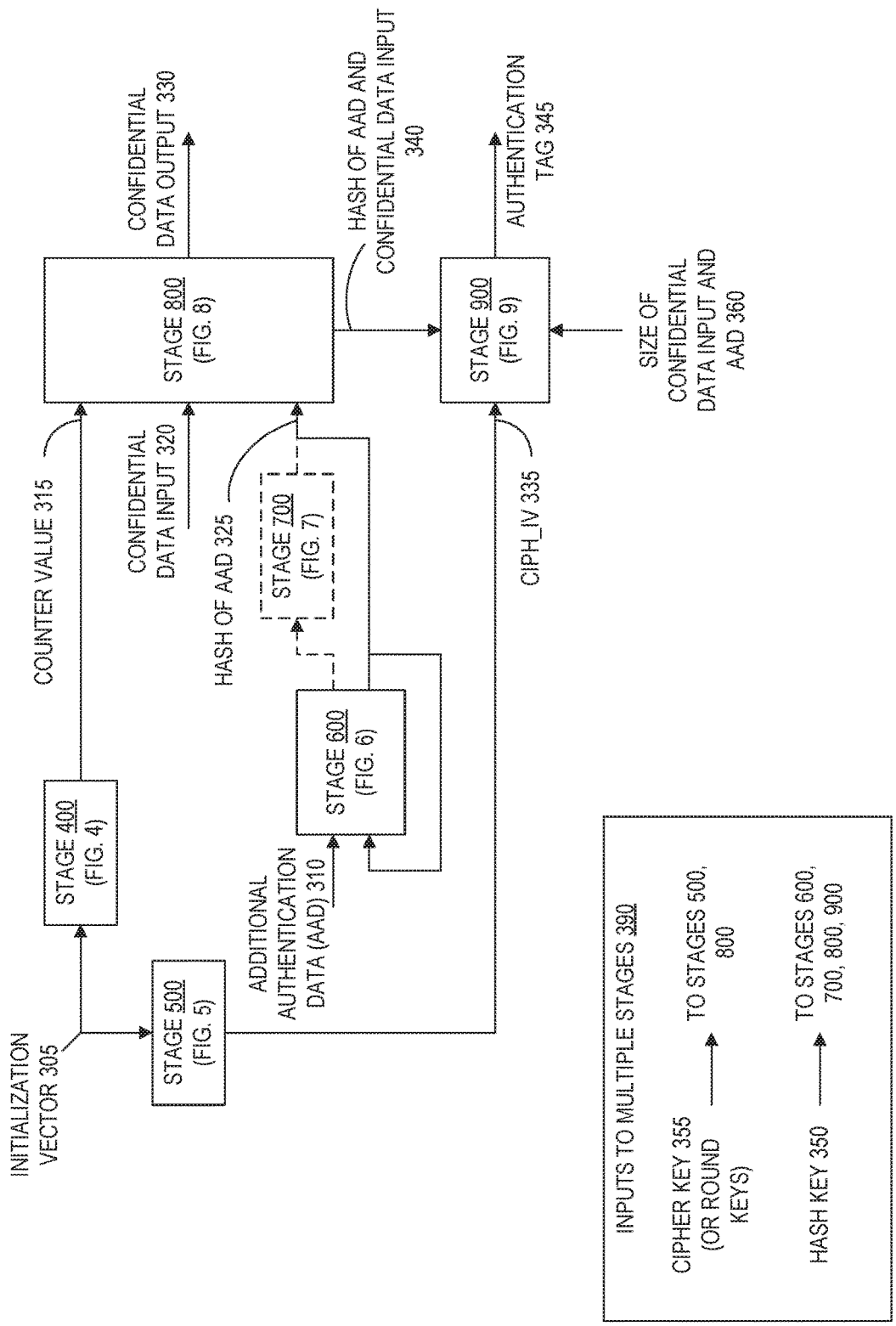
FIG. 3 is a functional block diagram of an overall approach for encrypting/decrypting and authenticating confidential data and authenticating additional data.

FIG. 3 is a functional block diagram of an overall approach for encrypting/decrypting and authenticating confidential data and authenticating additional data. In this depiction, the approach is broken into stage 400, stage 500, stage 600, stage 700 (optional), stage 800, and stage 900. In some embodiments, the approach implements a Galois/ Counter Mode (GCM) of operation of a cipher. Additional details regarding GCM can be found in the National Institute of Standards and Technology (NIST) Special Publication 800-38D. In some embodiments, the cipher is the Advanced Encryption Standard (AES) cipher, described in Federal Information Processing Standard (FIPS) Publication 197.

When encrypting, the inputs include an initialization vector (IV) 305, additional authentication data (AAD) 310, and confidential data input 320 (in the form of a plaintext P), and the outputs include confidential data output 330 (in the form of a ciphertext C) and an authentication tag 345. When decrypting, the inputs include the IV 305, the AAD 310, and confidential data input 320 (in the form of a ciphertext C), and the outputs include a confidential data output 330 (in the form of a plaintext P) and an authentication tag 345. Inputs to multiple stages 390 during either encryption or decryption include a cipher key 355, which may comprise multiple round keys, to stages 500 and 800, and a hash key 350 to stages 600, 700, 800, and 900.

Note that the authentication tag generated during the encryption process can later be compared to the authentication tag generated during the decryption process to authenticate the confidential data and the AAD.

Stages 400 and 500 calculate certain values based on the initialization vector IV 305 which are used by stages 800 and 900. One such value is CIPH_IV 335, which is the result of the block cipher applied to the IV 305 as described herein. Stages 400 and 500 are described in further detail with reference to FIGS. 4 and 5.

Stage 600 calculates a hash of the AAD 310 (if present). As described below, calculating the hash of the AAD 310 includes iterating over the AAD 310 some number of times, depending on the length of the AAD 310. In some embodiments, stage 600 performs one fewer hash iteration than the total number of iterations required based on the length of AAD 310, and the final hash calculation is performed by stage 700. Stages 600 and 700 are described in further detail with reference to FIGS. 6 and 7.

Stage 800 receives a counter value 315 from stage 400 as input 315, the confidential data input 320, and the AAD hash 325 from stage 600 or 700. Stage 800 encrypts or decrypts the confidential data input 320 to generate the respective ciphertext C or plaintext P at confidential data output 330. Stage 800 further modifies the hash of the AAD 310 to authenticate the processed confidential data input 320 and outputs the updated hash at output 340. Stage 800 is described in further detail with reference to FIG. 8.

Stage 900 receives the updated hash output from stage 800 (representing a hash of the AAD 310 and the confidential data input 320) and the output of stage 500 and generates an authentication tag 345. Stage 900 is described in further detail with reference to FIG. 9.

In some embodiments, the stages illustrated in FIG. 3 and described with reference to FIGS. 4 through 9 are machine-executable instructions that cause a general-purpose or special-purpose processor to perform the operations described herein. Alternatively, the operations may be performed by specific hardware components that contain hardwired logic for performing the operations, or by any combination of programmed computer components and custom hardware components.

The approach illustrated in FIGS. 3 through 9 is a block-based approach where processor 105 and/or accelerator 115 iteratively operate on the confidential and AAD 310 in blocks of data of a predetermined size. For example, if the block size is 128-bits, confidential data (or AAD 310) of lengths 128-bits, 255-bits, and 257-bits would comprise 1, 2, and 3 blocks, respectively. Note that the confidential data input 320 and AAD 310 may but need not be the same length. Processor 105 or accelerator 115 handles confidential or AAD 310 of a size that is a non-integer multiple of the block size via various padding and/or truncation operations as described herein.

Figure 4:
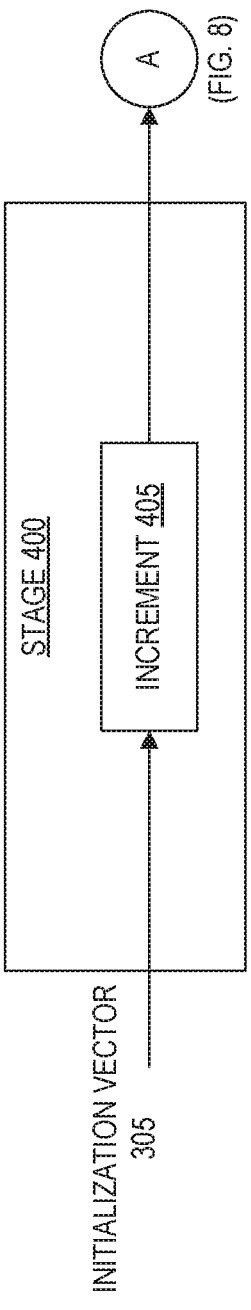
FIGS. 4 and 5 are block diagrams of initial stages of an approach for encrypting/decrypting and authenticating confidential data and authenticating additional data.
Figure 5:
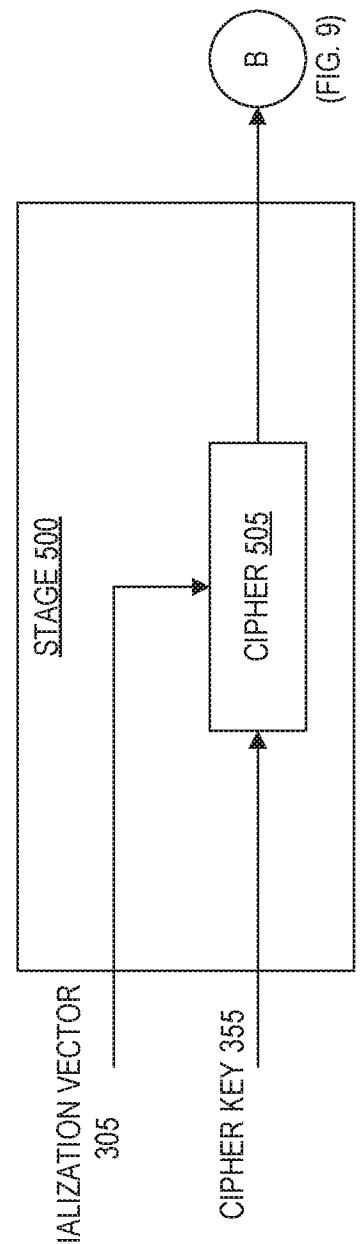

FIGS. 4 and 5 are block diagrams of initial stages 400, 500 of an approach for encrypting/decrypting and authenticating confidential data and authenticating additional data. Stage 400 includes an increment block 405 implemented as part of processor 105 or accelerator 115. Increment block 405 receives as input the IV 305 and outputs the input incremented by an amount (e.g., 1). In some embodiments, the size of the IV 305 is the size of the block size (with or without padding). For example, the size of IV 305 is 128 bits if the block size is 128-bits. The IV 305 may be based on a value that is predetermined or negotiated between the sender and receiver of an authenticated, encrypted message sent over a medium (e.g., a network, a memory, etc.). The output of increment block 405 is an input A to the stage illustrated in FIG. 8.

Stage 500 includes a cipher block 505 implemented as part of processor 105 or accelerator 115. Cipher block 505 receives the IV 305 and, based on the cipher key 355 and a block cipher, confuses and diffuses the bits of the IV to generate an output. One such block cipher is AES. The output of the cipher block 505 is an input B to the stage illustrated in FIG. 9.

FIGS. 6 and 7 are block diagrams of the AAD hashing stages 600, 700 of an approach for encrypting/decrypting and authenticating confidential data and authenticating additional data. Hashing the AAD 310 comprises zero or more rounds of hashing to generate an authentication hash of the AAD 310. For example, if the block size is 128-bits and the size of the AAD 310 is 768 bits, stage 600 repeats six times (768/128) on sequential blocks of AAD 310, as described below.

Stage 600 includes an exclusive-OR block 605 and a hash block 610 implemented as part of processor 105. Exclusive-OR block 605 receives as inputs a block of AAD 310 and either a zero-vector of size equal to the block size or the output of hash block 610 and outputs a bitwise exclusive-OR of the inputs. Exclusive-OR block 605 receives the zero-vector (identified by the circled '0') during the initial round of hashing. In rounds after the initial round and before the final round, exclusive-OR block 605 receives the output of hash block 610 (identified by circle C) and the next block of A.

Hash block 610 receives as input the output of exclusive-OR block 605 and a hash key 350 and outputs a hash of the corresponding block of AAD 310 (based on the round). An exemplary hash function is based on Galois field multiplication, where the input is multiplied in the Galois Field $GF(2^{128})$ with a hash key followed by reduction of the product by an irreducible polynomial in $GF(2^{128})$. In some embodiments, the hash key 350 is derived from the cipher key 355. The output of hash block 610 is an input C to exclusive-OR block 605 (as described above) or an input E to the stage illustrated in FIG. 8.

Figure 11:
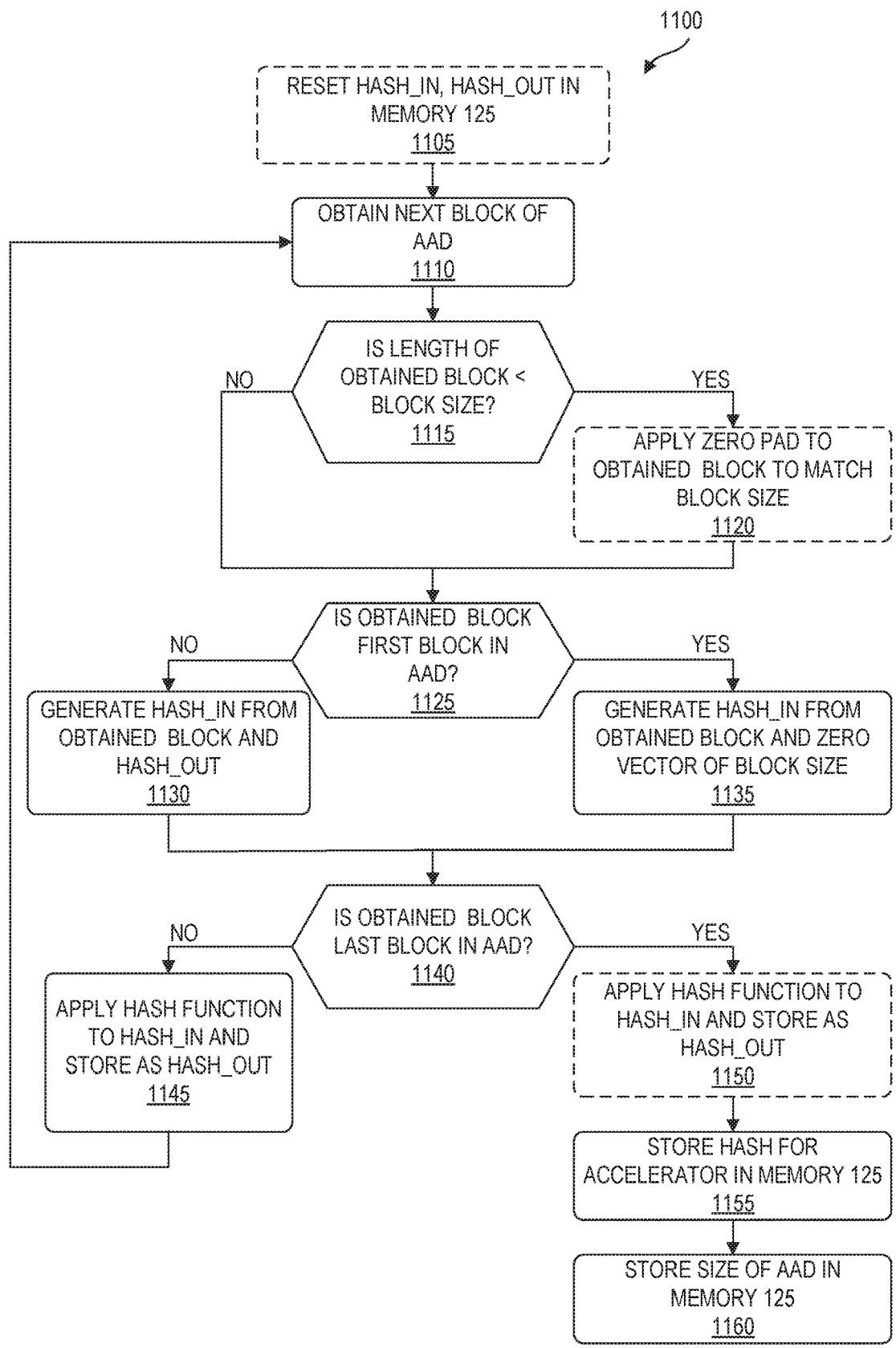
FIG. 11 is a simplified flow diagram of at least one embodiment of a method of calculating a hash of additional authentication data.

In some embodiments, the hash of the output of the exclusive-OR block 605 on the final block of AAD 310 is not calculated by processor 105. Instead, bypass 615 outputs the output of the exclusive-OR block 605 as an input D to the stage illustrated in FIG. 7. In embodiments that include bypass 615, stage 700 includes a hash block 710 implemented as part of accelerator 115. Hash block 710 performs hashing operations as described above for hash block 610. FIG. 11 and the associated description provide additional details of the stages illustrated in FIGS. 6 and 7.

FIG. 8 is a block diagram of a confidential data encryption or decryption and hashing stage 800 of an approach for encrypting/decrypting and authenticating confidential data and authenticating additional data. Encrypting or decrypting confidential data input 320 and hashing the same comprise one or more rounds of encryption/decryption and hashing. For example, if the block size is 128-bits and the size of the AAD 310 is 1,536 bits, stage 800 repeats twelve times (1,536/128) on sequential blocks of confidential input data 320, as described below.

Stage 800 includes increment block 805, cipher block 810, exclusive-OR block 815, exclusive-OR block 820, and hash block 825 implemented as part of accelerator 115. As indicated by circle A, increment block 805 receives as input either the output of increment block 405 in FIG. 4 (during the first round) or the output of increment block 805 (during rounds subsequent to the first round) and outputs the input incremented by an amount (e.g., 1).

Cipher block 810 receives as inputs the cipher key 355 and either the output of increment block 405 in FIG. 4 (during the first round) or the output of increment block 805 (during rounds subsequent to the first round). Based on those inputs, cipher block 810 outputs an encrypted value, similar to cipher block 505 described above.

Exclusive-OR block 815 receives as inputs a block of confidential data input 320 (e.g., a block of plaintext P, if encrypting, or a block of ciphertext C, if decrypting) and the output of cipher block 810 and outputs a bitwise exclusive-OR of the inputs. The output forms a block of confidential data output 330. For example, if exclusive-OR block 815 receives the third block of confidential data input 320, exclusive-OR block 815 outputs the third block of confidential data output 330. In some embodiments, when the size of the final block of the confidential data input 320 is smaller than the block size, the size of the final block of the corresponding block of confidential data output 330 is truncated to the size of the final block of the confidential data input 320.

Exclusive-OR block 820 receives as inputs the output of exclusive-OR block 815 and, as identified by circle E, either the output of hash block 610 in FIG. 6 or the output of hash block 710 in FIG. 7 (during the initial round) or the output of hash block 825 (during rounds subsequent to the initial round) and outputs a bitwise exclusive-OR of the inputs. In this manner, the final hash over all blocks of the AAD 310 is used to compute a hash over all blocks of the confidential data input 320.

Figure 12:
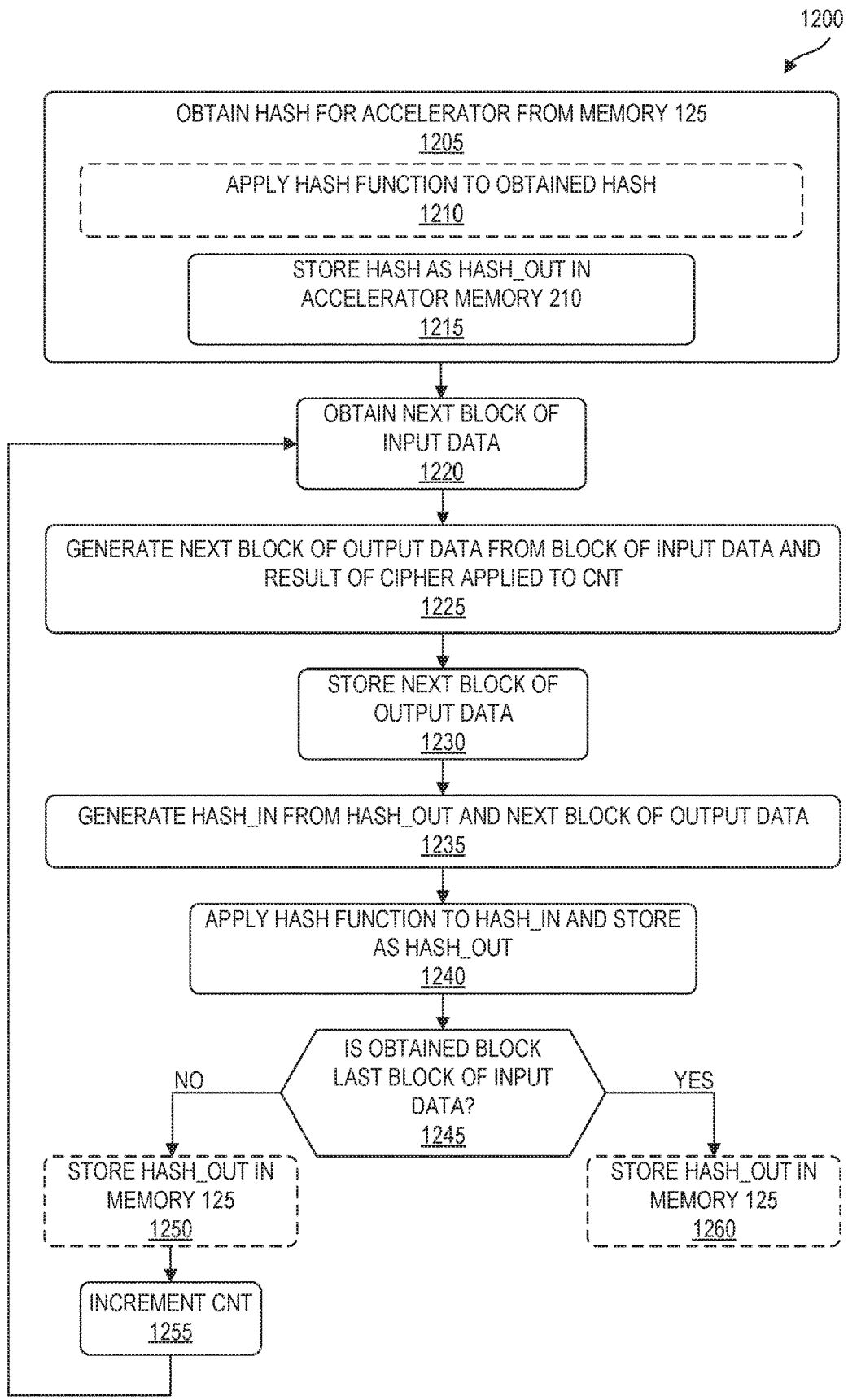
FIG. 12 is a simplified flow diagram at least one embodiment of a method of encrypting or decrypting and calculating a hash of confidential data.

Hash block 825 receives as inputs the output of exclusive-OR block 820 and the hash key 350 and outputs a hash of the corresponding block of confidential data input 320 that incorporates the hash of the AAD 310 (from the initial input of the hash of AAD 310 into exclusive-OR block 820 during the initial round of stage 800). FIG. 12 and the associated description provide additional details of the stage illustrated in FIG. 8.

FIG. 9 is a block diagram of a final stage 900 of an approach for encrypting/decrypting and authenticating confidential data and authenticating additional data. Stage 900 generates a final authentication tag that may be stored or transmitted along with the encrypted confidential data and the AAD 310 (in the case of encryption) or used to verify the integrity of the decrypted confidential data and AAD 310 (in the case of decryption) by comparing the generated tag against one that was generated during an earlier encryption process.

Figure 13:
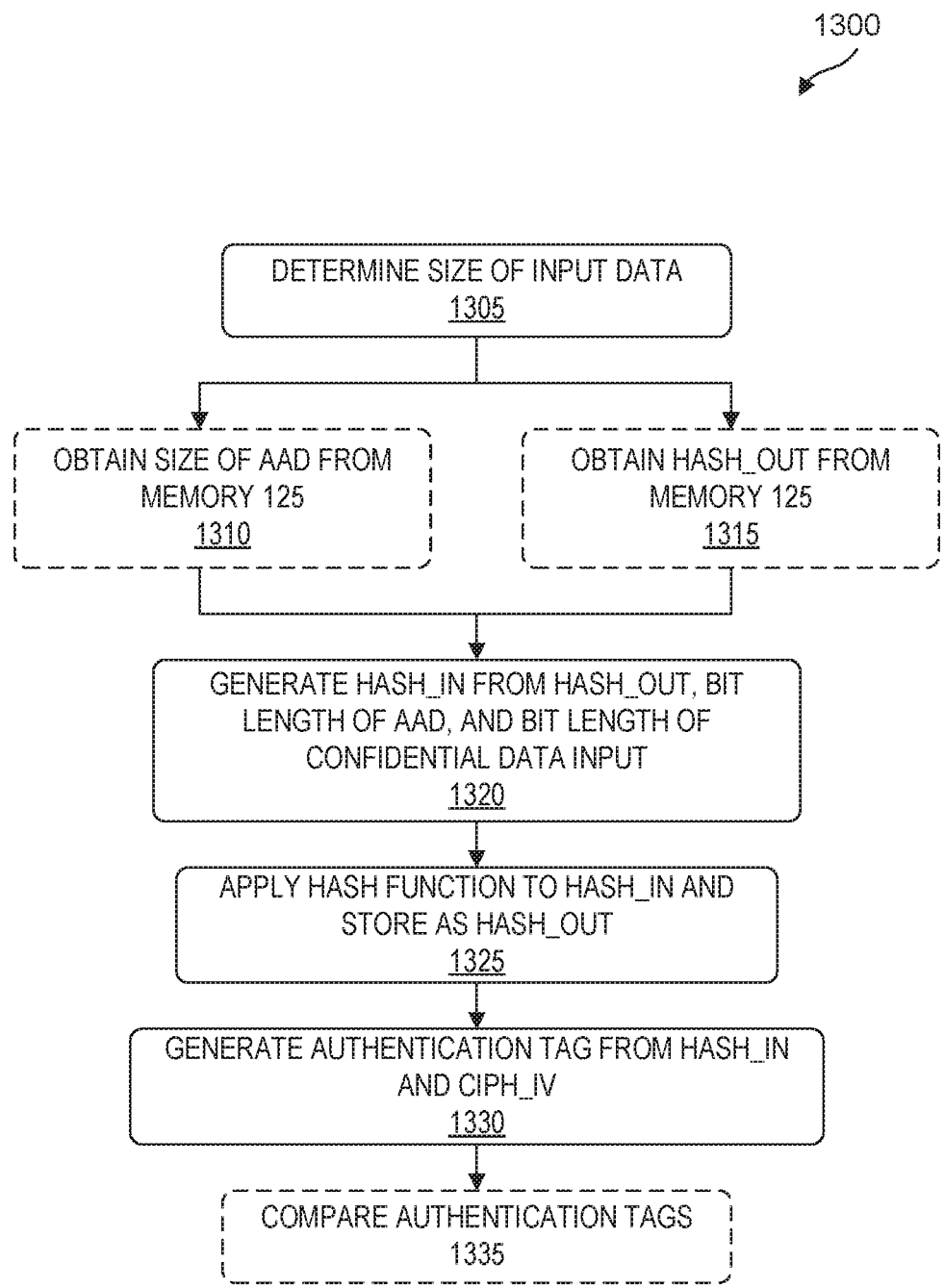
FIG. 13 is a simplified flow diagram at least one embodiment of a method of calculating an authentication tag of the confidential and additional authentication data.

Stage 900 includes exclusive-OR block 905, hash block 910, and exclusive-OR block 915 implemented as part of processor 105 or accelerator 115. Exclusive-OR block 905 receives as inputs the output of hash block 825, as identified by circle F, and a vector that includes fields that represent the bit-length of the AAD 310 (hashed in stage 600) and the bit-length of the confidential data input 320 (hashed in stage 800) and outputs a bitwise exclusive-OR of the inputs. Hash block 910 receives as inputs the output of exclusive-OR block 905 and the hash key 350 and outputs a hash value to exclusive-OR block 915. Exclusive-OR block 915 receives as inputs the output of hash block 910 and the output of cipher block 505 in stage 500 (identified by circle B) and outputs the bitwise exclusive-OR of the inputs, which represented the authentication tag 345. FIG. 13 and the associated description provide additional details of the stage illustrated in FIG. 9.

Setup

Figure 10:
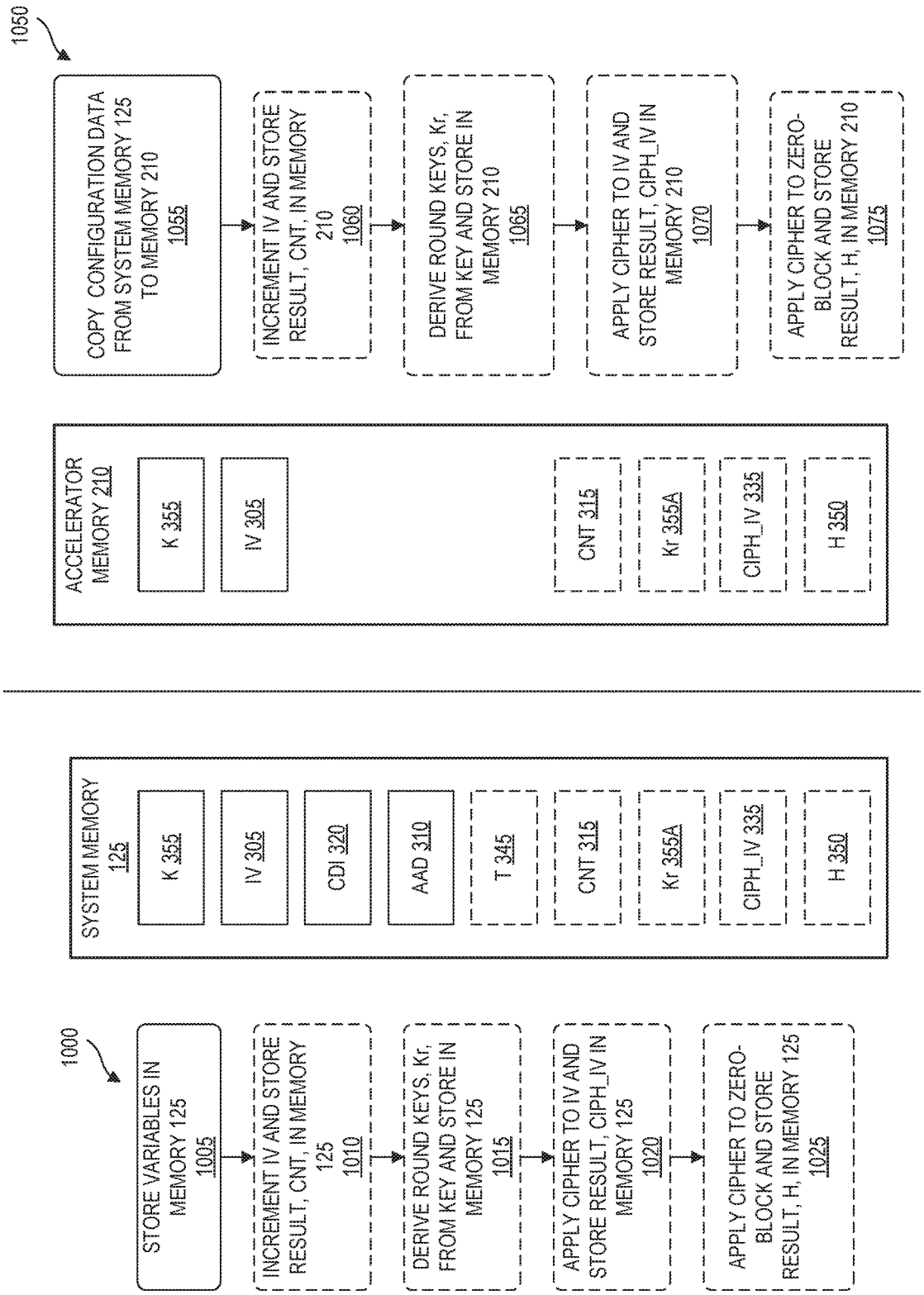
FIG. 10 is a simplified flow diagram of at least one embodiment of methods associated with a setup phase between a processor and an accelerator.

FIG. 10 is a simplified flow diagram of at least one embodiment of methods 1000, 1050 associated with a setup phase between a processor 105 and an accelerator 115. The left portion of FIG. 10 represents operations performed by processor 105 and the corresponding values stored in system memory 125, and the right portion of FIG. 10 represents operations performed by accelerator 115 and the corresponding values stored in accelerator memory 210.

At block 1005, processor 105 stores certain variables in system memory 125. Such variables can include the cipher key 355 (K), the IV 305, the confidential data input 320 (CDI), the AAD 310, and the authentication tag 345 (T) (if performing a decryption and authenticating against a previously generated tag).

In some embodiments, at block 1010 processor 105 increments IV with the increment function and stores the resulting counter value (CNT) 315 in system memory 125 (e.g., stage 400). Note that in some embodiments, the value of the IV 305 is modified by the processor 105 before incrementing.

In some embodiments, such as those using an AES cipher, the cipher key 355 is expanded into a number of keys that are used in consecutive rounds within the cipher blocks illustrated in FIGS. 5 and 8. That is, a single cipher block within a stage 500, 800 might comprise eleven rounds (or more, or less) of operations with the expanded keys. Thus, at block 1015, processor 105 derives or expands the cipher key 355 into multiple round keys identified collectively as Kr 355A and stores Kr 355A in system memory 125.

In some embodiments, at block 1020 processor 105 applies the block cipher to IV 305 (or a modified IV) and stores the result CIPH_IV 335 in system memory 125 (e.g., stage 500).

In some embodiments, at block 1025 processor 105 derives the hash key (H) 350 from the cipher key (K) 355 and stores the hash key 350 in system memory 125. In some embodiments, the hash key 350 is derived from the cipher key 355 by applying a zero-vector to a cipher block (not specifically illustrated in the figures). The cipher block receives as input a zero-vector corresponding to the block size of the cipher and the cipher key 355 and, based on the block cipher (e.g., AES), outputs a value that represents the hash key 350.

With reference to method 1050, at block 1055 accelerator 115 copies the available configuration data from system memory 125 to accelerator memory 210, depending on which values were determined by the processor 105. In some embodiments, accelerator 115 performs one or more of operations at blocks 1060, 1065, 1070, and 1075, corresponding to the operations described above for blocks 1010, 1015, 1020, and 1025, depending on the available configuration data in system memory 125. For example, if processor 105 performed operations 1010 and 1015 but not operations 1020 and 1025 in method 1000, accelerator 115 copies the cipher key 355, the IV 305, the counter value CNT 315, and the expanded round keys Kr 355A (if using a block cipher with multiple rounds) from system memory 125 into accelerator memory 210, and accelerator 115 performs operations 1070 and 1075 to determine the CIPH_IV 335 and the hash key 350. In some embodiments, configuration data includes the partially computed hash of the AAD (not shown), as described with reference to FIG. 11 (e.g., from bypass 615).

Hashing Additional Authentication Data

FIG. 11 is a simplified flow diagram of at least one embodiment of a method 1100 of calculating a hash of the AAD. Method 1100 corresponds to the rounds of operations in FIGS. 6 and 7.

At block 1105, processor 105 optionally resets hash variables (in this example, HASH_IN and HASH_OUT) in system memory 125. At block 1110, processor 105 obtains the next block of the AAD. As indicated above, the AAD is divided into portions (or blocks) based on the block size of the cipher/hash function. At block 1115, processor 105 determines whether the size (or length) of the obtained block is less than the block size. If the size of the obtained block is less than the block size (e.g., 96 bits versus a 128-bit block size), operations continue to block 1120, otherwise operations continue to block 1125. At block 1120, processor 105 pads the obtained block with zeros (or some other value, so long as it is consistent between the encryption and decryption processes).

At block 1125, processor 105 determines whether the obtained block is the first block of the AAD. If so, operations continue to block 1135, otherwise operations continue to block 1130. At block 1130, processor 105 generates an input for the hash function (HASH_IN) based on an exclusive-OR operation of the obtained block and the previous value of hash (HASH_OUT). At block 1135, processor 105 generates an input for the hash function (HASH_IN) based on an exclusive-OR operation of the obtained block and a zero vector of the block size. In embodiments where processor 105 resets HASH_OUT to zeroes at block 1105, block 1130 can replace blocks 1125 and 1135.

At block 1135, processor 105 determines whether the obtained block is the last block of the AAD. If so, operations continue to block 1150, otherwise operations continue to block 1145. At block 1145, processor 105 applies the hash function to HASH_IN, stores the result as HASH_OUT, and returns to block 1110 to obtain the next block of the AAD, as described herein. At block 1150, processor 105 optionally applies the hash function to HASH_IN and stores the result of HASH_OUT. Whether processor 105 performs operations at block 1150 is contingent on whether accelerator 115 has circuitry to perform the hash function identified in FIG. 7. At block 1155, processor 105 stores the hash of the AAD 310 in system memory 125 for the accelerator. The hash may be the HASH_OUT from block 1150 or the HASH_IN from block 1130 or 1135. At block 1160, processor 105 stores the size (or length) of AAD 310 in system memory 125. In some embodiments, the size of AAD 310 is determined during method 1100 (e.g., by multiplying the number of iterations times the block size and subtracting the number of bits added in padding, if any).

Encrypting or Decrypting and Authenticating Confidential Data

FIG. 12 is a simplified flow diagram of at least one embodiment of a method 1200 of encrypting or decrypting and calculating a hash of confidential data. Method 1200 corresponds to the rounds of operations in FIG. 8.

At block 1205, accelerator 115 obtains the hash calculated by processor 105 (e.g., with method 1100) from system memory 125. At block 1210, accelerator 115 performs a hash operation on the obtained hash, depending on whether processor 105 performed the final hash operation on AAD 310 (identified in FIG. 7, described with respect to block 1150 in FIG. 11). At block 1215, the hash obtained at block 1205 and possibly hashed at block 1210 is stored in accelerator memory 210 (e.g., as a variable HASH_OUT).

At block 1220, accelerator 115 obtains the next block of the confidential data input 320. The confidential data input 320 (to exclusive-OR block 815 FIG. 8) may be the plaintext P being encrypted or the ciphertext C being decrypted. In some embodiments, the plaintext or ciphertext is stored in system memory 125 (e.g., for an IMDB) or buffered into system memory 125 (e.g., from a network or storage interface) by the processor 105. In some embodiments, interface 205A copies chunks of input data from system memory 125 into a buffer or queue for processing by the accelerator 115.

At block 1225, accelerator 115 generates the next block of the confidential data output 330 (from exclusive-OR block 815 in FIG. 8) based on an exclusive-OR operation of the obtained block of input data and the result of the cipher function applied to the current value of the counter (CNT). Note that if the obtained block of input data is less than the block size, accelerator 115 truncates the confidential data output 330 generated at block 1225 to match the length of the obtained block of the confidential data input 320. This operation generally occurs for the last block of input data (e.g., when the plaintext/ciphertext is not an integer multiple of the block size). For example, if the input data is 3 bits, the output data is the 3 bits generated from the exclusive-OR operations performed on those 3 bits.

At block 1230, accelerator 115 stores the block of output data generated at block 1225. In some embodiments, accelerator 115 stores the blocks of output data generated at block 1225 in a buffer or queue pending transfer to system memory 125 by interface 205A.

At block 1235, accelerator 115 generates an input for the hash function (HASH_IN) based on an exclusive-OR operation of the block of output data and the previous value of hash (HASH_OUT). In cases where the block of output data is less than the block size, accelerator 115 pads the obtained block with zeros before the exclusive-OR operation (or some other value, so long as it is consistent between the encryption and decryption processes).

At block 1240, accelerator 115 applies the hash function to HASH_IN and stores the result as HASH_OUT. At block 1245, accelerator 115 determines whether the obtained block of input data is the last block of input data. In some embodiments, accelerator 115 makes that determination by checking whether interface 205A has reached the end of the address range from which it is copying ciphertext C or plaintext P (as confidential data input 320). If the obtained block of input data is the last block of input data, operations continue to block 1260, otherwise operations continue to block 1250. At block 1250, accelerator 115 stores an intermediate value of the hash in system memory 125 and continues to block 1255.

At block 1255, accelerator 115 increments the value of the counter CNT and returns to block 1220 to obtain the next block of input data, as described herein. Note that in some scenarios, accelerator 115 delays before obtaining the next block of input data at block 1220. For example, processor 105 may have a fixed amount of buffer space available in system memory 125 for the confidential data input 320 (C or P). Such a situation might arise where the input data is being streamed from another medium (e.g., a network location or a storage drive). If a three-kilobyte plaintext is buffered in system memory 125 one kilobyte at a time, operations 1220 through 1255 might repeat 64 times for the first kilobyte (8,192 bits/128-bit block size), delay, repeat another 64 times for the second kilobyte, delay, and repeat a final 64 times for the third kilobyte. Because the hash is calculated over the entire P or C, so long as all but the last portion that the accelerator operates have a size that is an integer multiple of the block size, accelerator 115 can encrypt or decrypt portions of P or C at a time. Thus, accelerator 115 may operate on portions of a confidential data input 320 without completing the entire encryption or decryption operation.

In embodiments where processor 105 performs operations illustrated in FIG. 13, accelerator 115 stores the final value of the hash HASH_OUT in system memory 125 at block 1260.

Tag Generation

FIG. 13 is a simplified flow diagram at least one embodiment of a method 1300 of calculating an authentication tag of the confidential data input 320 and AAD 310. Method 1300 corresponds to the operations in FIG. 9.

Method 1300 may be performed by processor 105 or accelerator 115, subject to the variations described herein.

At block 1305, processor 105 or accelerator 115 determines the size (e.g., length) of the confidential data input 320 (plaintext P or ciphertext C). In some embodiments, processor 105 determines the size based on the footprint of P or C in system memory 125. In other embodiments, the size of P or C may be stored along with P or C as, for example, metadata. In some embodiments, accelerator 115 determines the size of the input data while performing method 1200.

When performed by accelerator 115, method 1300 includes block 1310, where accelerator 115 obtains the size of the AAD 310 from system memory 125. When performed by processor 105, method 1300 includes block 1315, where processor 105 obtains the hash stored in memory at block 1260 in FIG. 12 (HASH_OUT).

At block 1320, processor 105 or accelerator 115 generates an input for the hash function based on the hash value over all of the additional authentication and confidential data (HASH_OUT), the size of the AAD, and the size of the confidential data. In some embodiments, the sizes of the AAD and the confidential data are represented as 64-bit binary values and concatenated together, the concatenation being exclusive-OR'd with HASH_OUT to generate HASH_IN.

At block 1325, processor 105 or accelerator 115 applies the hash function to HASH_IN and stores the result as HASH_OUT.

At block 1330, processor 105 or accelerator 115 generates the authentication tag T 345 based on an exclusive-OR operation of HASH_OUT and CIPH_IV 335 (the result of the cipher function applied to the initialization vector).

If accelerator 115 was performing a decrypt operation, method 1300 continued to block 1335. At block 1335, processor 105 or accelerator 115 compares the generated authentication tag 345 to a tag transmitted or stored with the decrypted confidential data and AAD to verify the authenticity of the confidential data and the AAD when the tags match. Note that if the comparison is performed by accelerator 115, accelerator 115 reads or otherwise obtains the non-generated tag from system memory 125, e.g., akin to the other configuration values described with reference to FIG. 10.

Exemplary Data Flows

The described allocation of encryption, decryption, and hashing operations between the processor 105 and accelerator 115 provide a high degree of flexibility for performing the operations described herein even in scenarios where the amount of I/O operations per second by the accelerator 115 is limited. Two exemplary scenarios are now described.

In a first scenario, accelerator 115 only includes two interfaces 205A and 205B. Interface 205A streams data to be processed by encrypt/decrypt unit 116, compress/decompress unit 117, and/or filter unit 118. Interface 205B streams configuration or control data to the units. Streaming AAD and confidential data via a single interface to the encrypt/decrypt unit 116 imposes certain additional requirements on accelerator, neither of which may be possible. Because confidential data and AAD are typically buffered in separate buffers, streaming both increases the buffer size in accelerator memory. Alternatively, the size of the buffer in accelerator memory can remain the same, but the complexity of the interface increases in order to alternate between fetching confidential data and fetching AAD from system memory 125. As such, pre-hashing the AAD 310 by processor 105 eliminates the need to stream AAD 310 via interface 205A, and the partially computed hash of AAD 310 can be loaded via interface 205B as part of the configuration data. For example, processor 105 performs methods 1000 and 1100. Then, accelerator performs block 1055 of method 1050 (via interface 205B) and method 1200 (via interface 205A). Finally, processor 105 performs method 1300. In this manner, the amount of time streaming data to AAD 310 to accelerator via interface 205A is eliminated, freeing the accelerator 115 to perform other operations.

In a second scenario, processor 105 is able to interleave encryption or decryption operations carried out by accelerator 115 with other accelerator 115 operations. This includes both interleaving the encryption of a first ciphertext and a second ciphertext, the encryption of a ciphertext and a plaintext, or the encryption or decryption or a plaintext or a ciphertext, respectively, with other operations such as compress, decompress, or filter (e.g., via compress/decompress unit 117, and/or filter unit 118). As explained, accelerator 115 may operate on portions of P or C by accepting a hash input and storing a hash output. For example, at block 1205, accelerator 115 obtains a hash of AAD from the processor, and, at block 1250, accelerator 115 stores an intermediate hash of the so-far processed data. To initiate interleave another operation, the hash the processor 105 stores in system memory 125 can be either a hash of the AAD or a hash of the AAD and a portion of the ciphertext or plaintext, as output from the accelerator at block 1250. Thus, processor 105 can calculate a hash of A, and dispatch a block-aligned portion of a ciphertext to accelerator 115. When accelerator 115 completes the decryption, processor can store the hash value, dispatch other operations to the accelerator 115 (e.g., encrypting a portion of a plaintext, perform a decompress operation), and later load the stored hash value and dispatch the next portion of the ciphertext to the accelerator 115. In some embodiments, the location in system memory 125 in which the hash is loaded (e.g., at 1155) and stored (e.g., at 1250) is the same memory location with read/write access by both the processor 105 and accelerator 115.

In some embodiments, processor 105 and accelerator 115 communicate via one or more signals to start/stop operations, indicate when data is available, etc. For example, processor 105 writes to a memory location within accelerator 115 to initiate operations, and accelerator 115 issues an interrupt to indicate to processor 105 that operations are complete.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing (e.g., processor 105 in FIG. 1); and 2) a coprocessor including one or more special purpose cores intended primarily for graphics and/or scientific (throughput) (e.g., accelerator 115 in FIG. 1). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 14A is a block diagram illustrating both an exemplary in-order pipeline and an exemplary register renaming, out-of-order issue/execution pipeline according to embodiments of the invention. FIG. 14B is a block diagram illustrating both an exemplary embodiment of an in-order architecture core and an exemplary register renaming, out-of-order issue/execution architecture core to be included in a processor according to embodiments of the invention. The solid lined boxes in FIGS. 14A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macroinstructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement the pipeline 1400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 15A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 15A is a block diagram of a single processor core, along with its connection to the on-die interconnect network 1502 and with its local subset of the Level 2 (L2) cache 1504, according to embodiments of the invention. In one embodiment, an instruction decoder 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 1512 and vector registers 1514) and data transferred between them is written to memory and then read back in from a level 1 (L1) cache 1506, alternative embodiments of the invention may use a different approach (e.g., use a single register set or include a communication path that allow data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and can be accessed quickly, in parallel with other processor cores accessing their own local L2 cache subsets. Data written by a processor core is stored in its own L2 cache subset 1504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 15B is an expanded view of part of the processor core in FIG. 15A according to embodiments of the invention. FIG. 15B includes an L1 data cache 1506A part of the L1 cache 1504, as well as more detail regarding the vector unit 1510 and the vector registers 1514. Specifically, the vector unit 1510 is a 16-wide vector processing unit (VPU) (see the 16-wide ALU 1528), which executes one or more of integer, single-precision float, and double-precision float instructions. The VPU supports swizzling the register inputs with swizzle unit 1520, numeric conversion with numeric convert units 1522A-B, and replication with replication unit 1524 on the memory input. Write mask registers 1526 allow predicating resulting vector writes.

Figure 16:
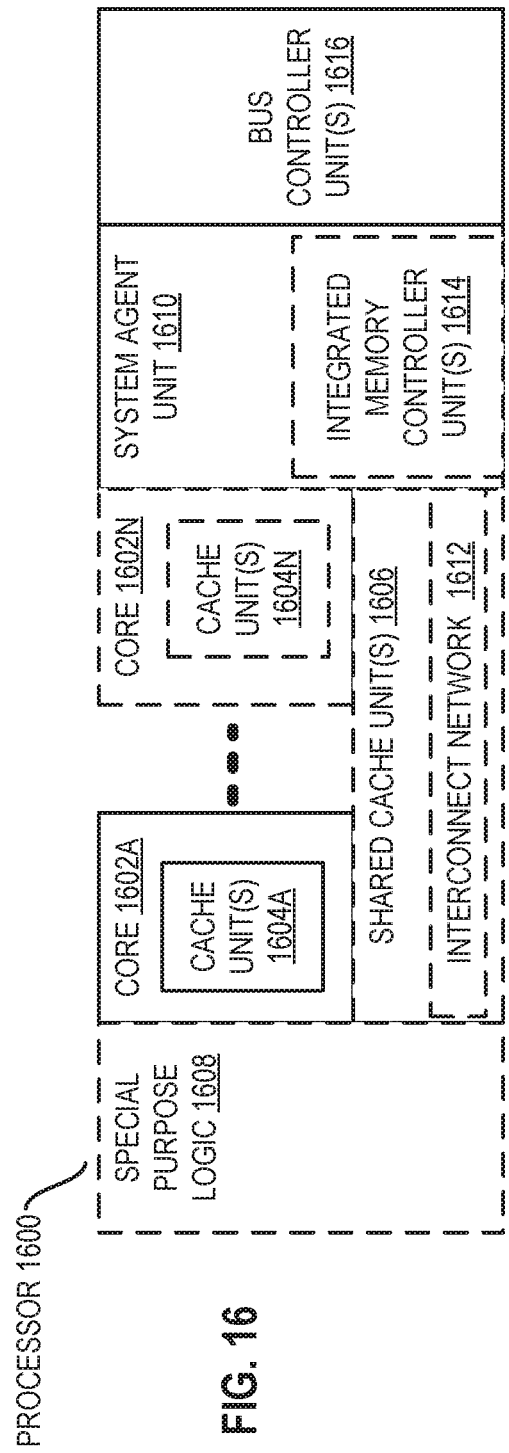
FIG. 16 is a block diagram of a processor 1600 that may have more than one core, may have an integrated memory controller, and may have integrated graphics according to embodiments of the invention.

FIG. 16 is a block diagram of a processor 1600 that may have more than one core, may have an integrated memory controller, and may have integrated graphics according to embodiments of the invention. The solid lined boxes in FIG. 16 illustrate a processor 1600 with a single core 1602A, a system agent 1610, a set of one or more bus controller units 1616, while the optional addition of the dashed lined boxes illustrates an alternative processor 1600 with multiple cores 1602A-N, a set of one or more integrated memory controller unit(s) 1614 in the system agent unit 1610, and special purpose logic 1608.

Thus, different implementations of the processor 1600 may include: 1) a CPU with the special purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special purpose cores intended primarily for graphics and/or scientific (throughput); and 3) a coprocessor with the cores 1602A-N being a large number of general purpose in-order cores. Thus, the processor 1600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1606, and external memory (not shown) coupled to the set of integrated memory controller units 1614. The set of shared cache units 1606 may include one or more mid-level caches, such as level 2 (L2), level 3 (L3), level 4 (L4), or other levels of cache, a last level cache (LLC), and/or combinations thereof. While in one embodiment a ring based interconnect unit 1612 interconnects the integrated graphics logic 1608 (integrated graphics logic 1608 is an example of and is also referred to herein as special purpose logic), the set of shared cache units 1606, and the system agent unit 1610/integrated memory controller unit(s) 1614, alternative embodiments may use any number of well-known techniques for interconnecting such units. In one embodiment, coherency is maintained between one or more cache units 1606 and cores 1602-A-N.

In some embodiments, one or more of the cores 1602A-N are capable of multi-threading. The system agent 1610 includes those components coordinating and operating cores 1602A-N. The system agent unit 1610 may include for example a power control unit (PCU) and a display unit. The PCU may be or include logic and components needed for regulating the power state of the cores 1602A-N and the integrated graphics logic 1608. The display unit is for driving one or more externally connected displays.

The cores 1602A-N may be homogenous or heterogeneous in terms of architecture instruction set; that is, two or more of the cores 1602A-N may be capable of execution the same instruction set, while others may be capable of executing only a subset of that instruction set or a different instruction set.

Exemplary Computer Architectures

FIGS. 17-20 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 17:
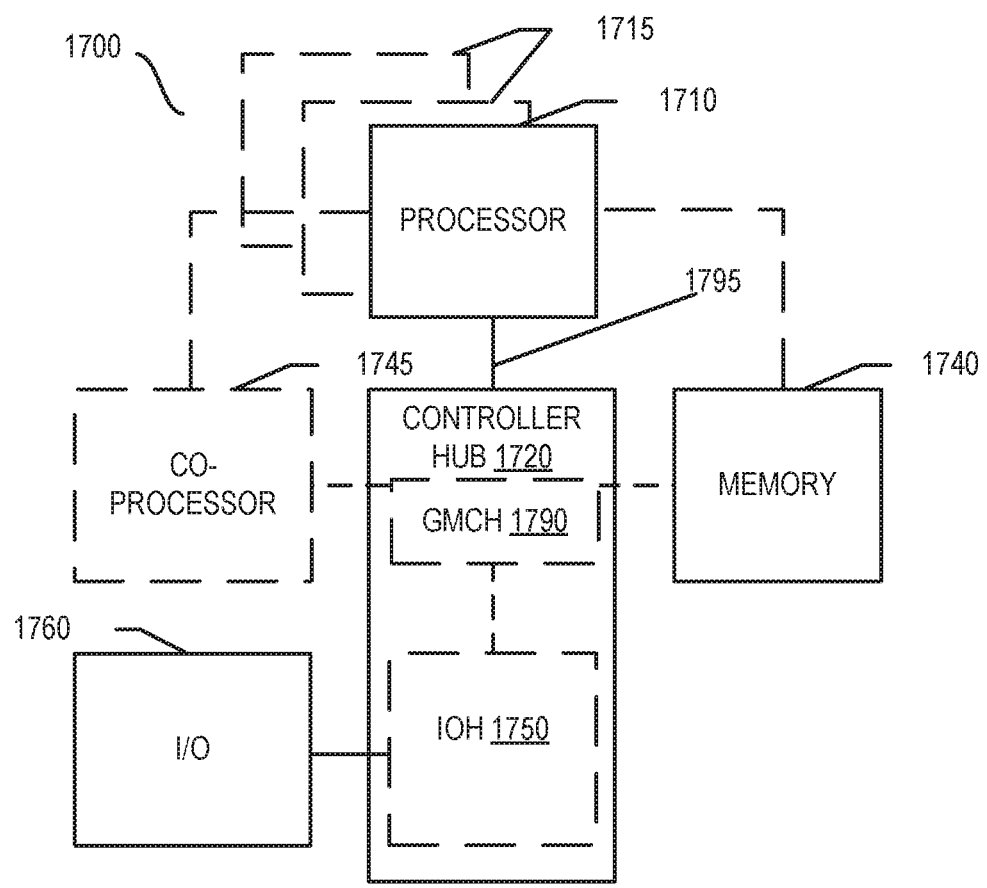
FIGS. 17-20 are block diagrams of exemplary computer architectures.

Referring now to FIG. 17, shown is a block diagram of a system 1700 in accordance with one embodiment of the present invention. The system 1700 may include one or more processors 1710, 1715, which are coupled to a controller hub 1720. In one embodiment the controller hub 1720 includes a graphics memory controller hub (GMCH) 1790 and an Input/Output Hub (IOH) 1750 (which may be on separate chips); the GMCH 1790 includes memory and graphics controllers to which are coupled memory 1740 and a coprocessor 1745; the IOH 1750 couples input/output (I/O) devices 1760 to the GMCH 1790. Alternatively, one or both of the memory and graphics controllers are integrated within the processor (as described herein), the memory 1740 and the coprocessor 1745 are coupled directly to the processor 1710, and the controller hub 1720 in a single chip with the IOH 1750.

The optional nature of additional processors 1715 is denoted in FIG. 17 with broken lines. Each processor 1710, 1715 may include one or more of the processing cores described herein and may be some version of the processor 1600.

The memory 1740 may be, for example, dynamic random access memory (DRAM), phase change memory (PCM), or a combination of the two. For at least one embodiment, the controller hub 1720 communicates with the processor(s) 1710, 1715 via a multi-drop bus, such as a frontside bus (FSB), point-to-point interface such as QuickPath Interconnect (QPI), or similar connection 1795.

In one embodiment, the coprocessor 1745 is a special-purpose processor, such as, for example, a high-throughput MIC processor, a network or communication processor, compression engine, graphics processor, GPGPU, embedded processor, or the like. In one embodiment, controller hub 1720 may include an integrated graphics accelerator.

There can be a variety of differences between the physical resources 1710, 1715 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor(s) 1745 accept and execute the received coprocessor instructions.

Figure 18:
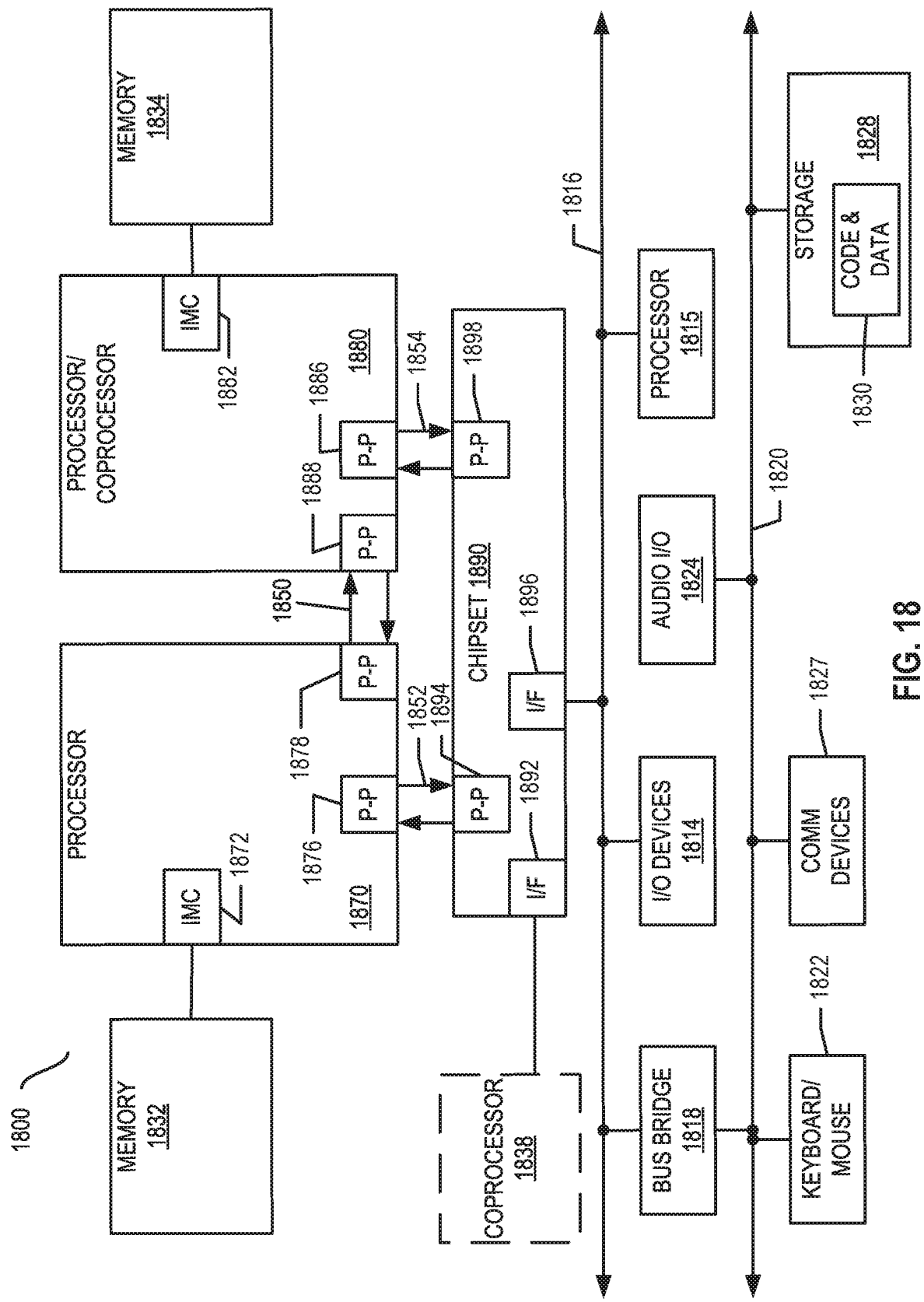

Referring now to FIG. 18, shown is a block diagram of a first more specific exemplary system 1800 in accordance with an embodiment of the present invention. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of the processor 1600. In one embodiment of the invention, processors 1870 and 1880 are respectively processors 1710 and 1715, while coprocessor 1838 is coprocessor 1745. In another embodiment, processors 1870 and 1880 are respectively processor 1710 coprocessor 1745.

Processors 1870 and 1880 are shown including integrated memory controller (IMC) units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1892. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present invention is not so limited.

As shown in FIG. 18, various I/O devices 1814 may be coupled to first bus 1816, along with a bus bridge 1818 which couples first bus 1816 to a second bus 1820. In one embodiment, one or more additional processor(s) 1815, such as coprocessors, high-throughput MIC processors, GPGPU's, accelerators (such as, e.g., graphics accelerators or digital signal processing (DSP) units), field programmable gate arrays, or any other processor, are coupled to first bus 1816. In one embodiment, second bus 1820 may be a low pin count (LPC) bus. Various devices may be coupled to a second bus 1820 including, for example, a keyboard and/or mouse 1822, communication devices 1827 and a storage unit 1828 such as a disk drive or other mass storage device which may include instructions/code and data 1830, in one embodiment. Further, an audio I/O 1824 may be coupled to the second bus 1820. Note that other architectures are possible. For example, instead of the point-to-point architecture of FIG. 18, a system may implement a multi-drop bus or other such architecture.

Figure 19:
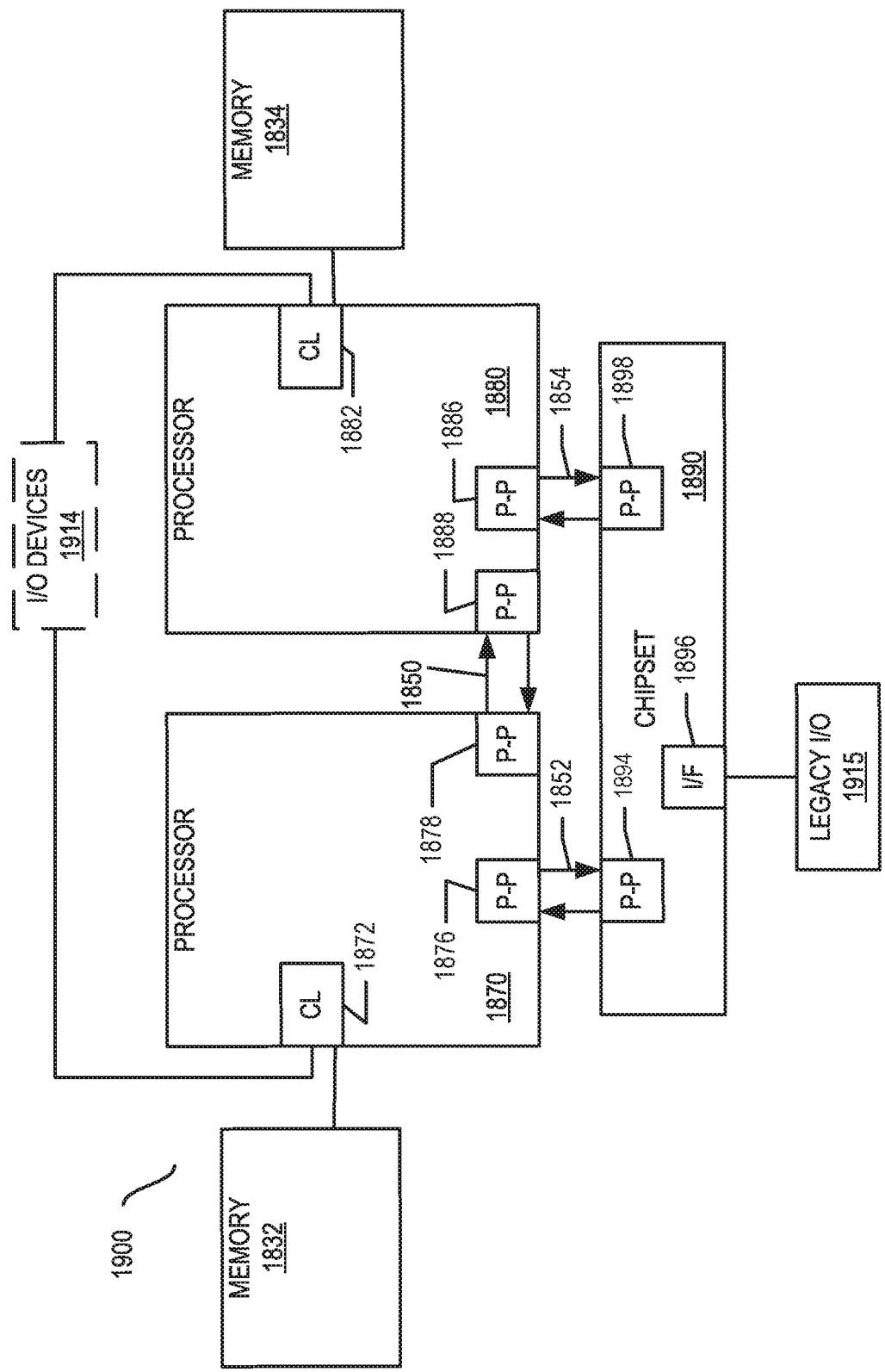

Referring now to FIG. 19, shown is a block diagram of a second more specific exemplary system 1900 in accordance with an embodiment of the present invention. Like elements in FIGS. 18 and 19 bear like reference numerals, and certain aspects of FIG. 18 have been omitted from FIG. 19 in order to avoid obscuring other aspects of FIG. 19.

FIG. 19 illustrates that the processors 1870, 1880 may include integrated memory and I/O control logic ("CL") 1872 and 1882, respectively. Thus, the CL 1872, 1882 include integrated memory controller units and include I/O control logic. FIG. 19 illustrates that not only are the memories 1832, 1834 coupled to the CL 1872, 1882, but also that I/O devices 1914 are also coupled to the control logic 1872, 1882. Legacy I/O devices 1915 are coupled to the chipset 1890.

Figure 20:
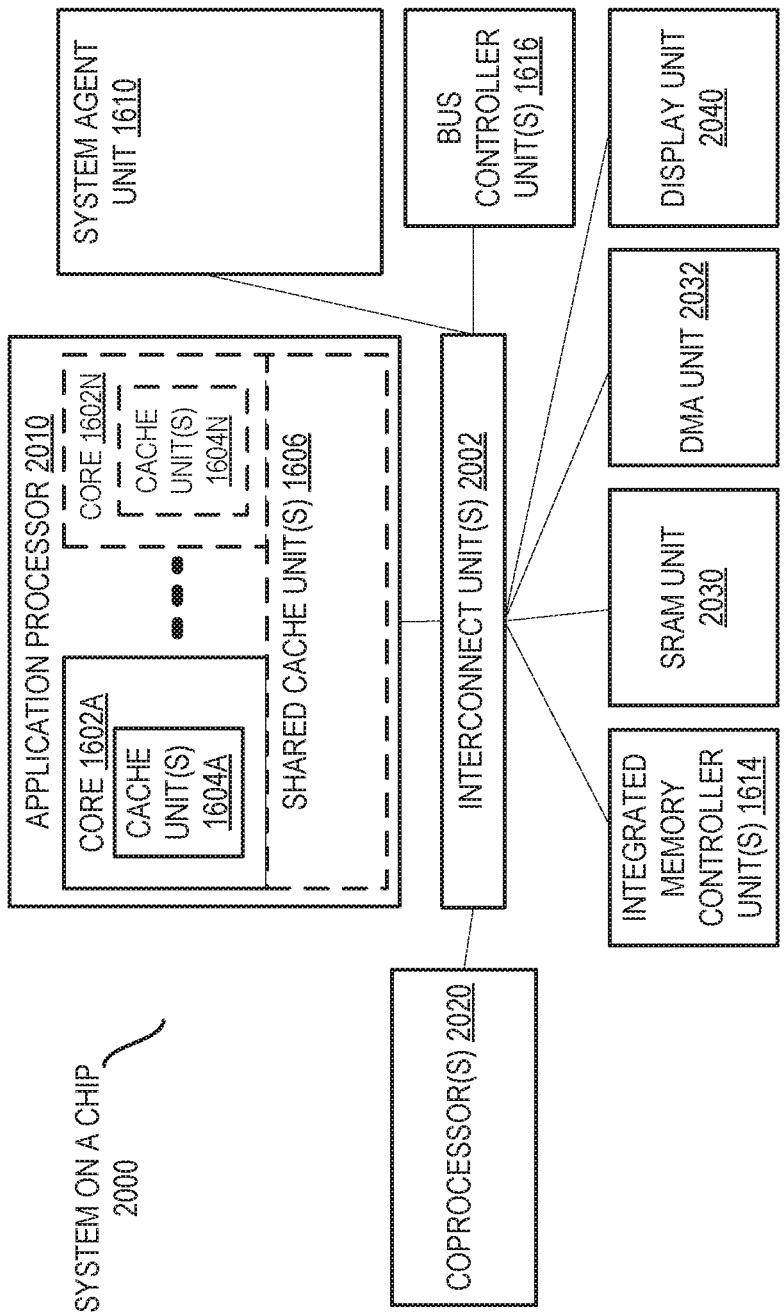

Referring now to FIG. 20, shown is a block diagram of a SoC 2000 in accordance with an embodiment of the present invention. Similar elements in FIG. 16 bear like reference numerals. Also, dashed lined boxes are optional features on more advanced SoCs. In FIG. 20, an interconnect unit(s) 2002 is coupled to: an application processor 2010 which includes a set of one or more cores 1602A-N, which include cache units 1604A-N, and shared cache unit(s) 1606; a system agent unit 1610; a bus controller unit(s) 1616; an integrated memory controller unit(s) 1614; a set or one or more coprocessors 2020 which may include integrated graphics logic, an image processor, an audio processor, and a video processor; an static random access memory (SRAM) unit 2030; a direct memory access (DMA) unit 2032; and a display unit 2040 for coupling to one or more external displays. In one embodiment, the coprocessor(s) 2020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 21 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 21 shows a program in a high level language 2102 may be compiled using an x86 compiler 2104 to generate x86 binary code 2106 that may be natively executed by a processor with at least one x86 instruction set core 2116. The processor with at least one x86 instruction set core 2116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2104 represents a compiler that is operable to generate x86 binary code 2106 (e.g., object code) that can, with or without additional linkage processing, be executed on the processor with at least one x86 instruction set core 2116. Similarly, FIG. 21 shows the program in the high level language 2102 may be compiled using an alternative instruction set compiler 2108 to generate alternative instruction set binary code 2110 that may be natively executed by a processor without at least one x86 instruction set core 2114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2112 is used to convert the x86 binary code 2106 into code that may be natively executed by the processor without an x86 instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation or any other process, allows a processor or other electronic device that does not have an x86 instruction set processor or core to execute the x86 binary code 2106.

Examples

Example 1 provides an exemplary apparatus to process confidential data and additional authentication data comprising processor circuitry to: compute a first hash of a first block of data stored in a memory, store the first hash in the memory, and generate an authentication tag based in part on a second hash; and accelerator circuitry to: obtain the first hash from the memory, decrypt a second block of data using the first hash, and compute the second hash based in part on the first hash and the second block of data.

Example 2 includes the substance of the exemplary apparatus of Example 1, wherein the authentication tag to authenticate the first block of data and the second block of data.

Example 3 includes the substance of the exemplary apparatus of Example 2, wherein the processor circuitry is to apply a cipher to an initialization vector to generate an output, and the authentication tag is further based in part on the output.

Example 4 includes the substance of the exemplary apparatus of Example 1, wherein the accelerator circuitry is to obtain a cipher key, a count value, and a hash key from the memory, the count value and the cipher key used to decrypt the second block of data, and the hash key used to compute the second hash.

Example 5 includes the substance of the exemplary apparatus of Example 1, wherein the accelerator circuitry comprises only two interfaces to read data from or write data to the memory.

Example 6 includes the substance of the exemplary apparatus of Example 5, wherein a first interface of the two interfaces is to read the second block of data from the memory and to write the decrypted second block of data to the memory and a second interface of the two interfaces is to read the first hash from the memory and write the second hash to the memory.

Example 7 includes the substance of the exemplary apparatus of Example 1, wherein the accelerator circuitry is to store the second hash in the memory, obtain the second hash from the memory, decrypt a third block of data, and compute a third hash based in part on the second hash and the third block of data, wherein the second block of data and the third block of data comprise a plaintext.

Example 8 provides an exemplary method process confidential data and additional authentication data comprising: computing, using processor circuitry, a first hash of a first block of data stored in a memory; storing, using processor circuitry, the first hash in the memory; generating, using processor circuitry, an authentication tag based in part on a second hash; obtaining, using accelerator circuitry, the first hash from the memory; decrypting, using accelerator circuitry, a second block of data using the first hash; and computing, using accelerator circuitry, the second hash based in part on the first hash and the second block of data.

Example 9 includes the substance of the exemplary method of Example 8, wherein the authentication tag is to authenticate the first block of data and the second block of data.

Example 10 includes the substance of the exemplary method of Example 9, further comprising applying, by the processor circuitry, a cipher to an initialization vector to generate an output, and the authentication tag is further based in part on the output.

Example 11 includes the substance of the exemplary method of Example 8, further comprising obtaining, by the accelerator circuitry, a cipher key, a count value, and a hash key from the memory, the count value and the cipher key used to decrypt the second block of data, and the hash key used to compute the second hash.

Example 12 includes the substance of the exemplary method of Example 8, wherein the accelerator circuitry comprises only two interfaces to read data from or write data to the memory.

Example 13 includes the substance of the exemplary method of Example 12, further comprising reading, by a first interface of the two interfaces, the second block of data from the memory and to write the decrypted second block of data to the memory; and reading, by a second interface of the two interfaces, the first hash from the memory and write the second hash to the memory.

Example 14 includes the substance of the exemplary method of Example 8, further comprising storing, by the accelerator circuitry, the second hash in the memory, obtaining the second hash from the memory, decrypting a third block of data, and computing a third hash based in part on the second hash and the third block of data, wherein the second block of data and the third block of data comprise a plaintext.

Example 15 provides an exemplary non-transitory machine-readable medium containing instructions that, when executed by a processor, cause the processor to process confidential data and additional authentication data by: computing, using processor circuitry, a first hash of a first block of data stored in a memory; storing, using processor circuitry, the first hash in the memory; generating, using processor circuitry, an authentication tag based in part on a second hash; obtaining, using accelerator circuitry, the first hash from the memory; decrypting, using accelerator circuitry, a second block of data using the first hash; and computing, using accelerator circuitry, the second hash based in part on the first hash and the second block of data.

Example 16 includes the substance of the exemplary non-transitory machine-readable medium of Example 15, wherein the authentication tag is to authenticate the first block of data and the second block of data.

Example 17 includes the substance of the exemplary non-transitory machine-readable medium of Example 16, further comprising applying, by the processor circuitry, a cipher to an initialization vector to generate an output, and the authentication tag is further based in part on the output.

Example 18 includes the substance of the exemplary non-transitory machine-readable medium of Example 15, further comprising obtaining, by the accelerator circuitry, a cipher key, a count value, and a hash key from the memory, the count value and the cipher key used to decrypt the second block of data, and the hash key used to compute the second hash.

Example 19 includes the substance of the exemplary non-transitory machine-readable medium of Example 15, wherein the accelerator circuitry comprises only two interfaces to read data from or write data to the memory.

Example 20 includes the substance of the exemplary non-transitory machine-readable medium of Example 19, further comprising reading, by a first interface of the two interfaces, the second block of data from the memory and to write the decrypted second block of data to the memory; and reading, by a second interface of the two interfaces, the first hash from the memory and write the second hash to the memory.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:
1. An apparatus comprising:
   processor circuitry to:
      compute a first hash based on performing a hashing round for each non-final block of a first data stored in a memory, the first data comprising additional authentication data comprising a plurality of blocks, compute an intermediate value based on a final block of the first data and the first hash;

store the intermediate value in the memory, and calculate an authentication tag based in part on a third hash; and accelerator circuitry coupled to the processor circuitry, the accelerator circuitry to:

obtain the intermediate value from the memory, compute a second hash based on the intermediate value, decrypt a first block of a second data, and compute the third hash based in part on the second hash and the decrypted first block of the second data.

2. The apparatus of claim 1, wherein the authentication tag is to authenticate the second data.

3. The apparatus of claim 2, wherein the processor circuitry is to apply a cipher to an initialization vector to generate an output, and the authentication tag is further based in part on the output.

4. The apparatus of claim 1, wherein the accelerator circuitry is to obtain a cipher key, a count value, and a hash key from the memory, the count value and the cipher key used to decrypt the first block of the second data, and the hash key used to compute the third hash.

5. The apparatus of claim 1, wherein the accelerator circuitry comprises only two interfaces to read data from or write data to the memory.

6. The apparatus of claim 5, wherein a first interface of the two interfaces is to read the first block of the second data from the memory and to write the decrypted first block of the second data to the memory and a second interface of the two interfaces is to read the intermediate value from the memory and write the third hash to the memory.

7. The apparatus of claim 1, wherein the accelerator circuitry is to store the third hash in the memory, obtain the third hash from the memory, decrypt a second block of the second data, and compute a fourth hash based in part on the third hash and the second block of the second data, wherein the decrypted first and second blocks of the second data comprise a plaintext.

8. A method comprising:

computing, using processor circuitry, a first hash based on performing a hashing round for each non-final block of a first data stored in a memory, the first data comprising additional authentication data comprising a plurality of blocks;

computing, using processor circuitry, an intermediate value based on a final block of the first data and the first hash;

storing, using processor circuitry, the intermediate value in the memory;

calculating, using processor circuitry, an authentication tag based in part on a third hash;

obtaining, using accelerator circuitry coupled to the processor circuitry, the intermediate value from the memory;

computing a second hash based on the intermediate value;

decrypting, using accelerator circuitry, a block of a second; and computing, using accelerator circuitry, the third hash based in part on the second hash and the second block of data.

9. The method of claim 8, wherein the authentication tag is to authenticate the second data.

10. The method of claim 9, further comprising applying, by the processor circuitry, a cipher to an initialization vector to generate an output, and the authentication tag is further based in part on the output.

11. The method of claim 8, further comprising obtaining, by the accelerator circuitry, a cipher key, a count value, and a hash key from the memory, the count value and the cipher key used to decrypt the first block of the second data, and the hash key used to compute the third hash.

12. The method of claim 8, wherein the accelerator circuitry comprises only two interfaces to read data from or write data to the memory.

13. The method of claim 12, further comprising reading, by a first interface of the two interfaces, the first block of the second data from the memory and writing the decrypted first block of the second data to the memory; and reading, by a second interface of the two interfaces, the intermediate value from the memory and writing the third hash to the memory.

14. The method of claim 8, further comprising storing, by the accelerator circuitry, the third hash in the memory, obtaining the third hash from the memory, decrypting a second block of the second data, and computing a fourth hash based in part on the third hash and the second block of the second data, wherein the decrypted first and second blocks of the second data comprise a plaintext.

15. A non-transitory machine-readable medium containing instructions that, when executed by a processor, cause the processor to respond by:

computing, using processor circuitry, a first hash based on performing a hashing round for each non-final block of a first data stored in a memory, the first data comprising additional authentication data comprising a plurality of blocks;

computing, using processor circuitry, an intermediate value based on a final block of the first data and the first hash;

storing, using processor circuitry, the intermediate value in the memory;

calculating, using processor circuitry, an authentication tag based in part on a third hash;

obtaining, using accelerator circuitry coupled to the processor circuitry, the intermediate value from the memory;

computing a second hash based on the intermediate value;

decrypting, using accelerator circuitry, a block of a second; and computing, using accelerator circuitry, the third hash based in part on the second hash and the second block of data.

16. The non-transitory machine-readable medium of claim 15, wherein the authentication tag is to authenticate the second data.

17. The non-transitory machine-readable medium of claim 16, further comprising applying, by the processor circuitry, a cipher to an initialization vector to generate an output, and the authentication tag is further based in part on the output.

18. The non-transitory machine-readable medium of claim 15, further comprising obtaining, by the accelerator circuitry, a cipher key, a count value, and a hash key from the memory, the count value and the cipher key used to decrypt the first block of the second data, and the hash key used to compute the third hash.

19. The non-transitory machine-readable medium of claim 15, wherein the accelerator circuitry comprises only two interfaces to read data from or write data to the memory.

20. The non-transitory machine-readable medium of claim 19, further comprising reading, by a first interface of the two interfaces, the first block of the second data from the memory and writing the decrypted first block of the second data to the memory; and reading, by a second interface of the two interfaces, the intermediate value from the memory and writing the third hash to the memory.

\* \* \* \* \*